United States Patent [19]

Mizukoshi et al.

[11] Patent Number: 5,583,800
[45] Date of Patent: Dec. 10, 1996

[54] VEHICLE SPEED SENSOR UTILIZING RELATIONSHIP BETWEEN VEHICLE WHEEL SPEED AND DOPPLER-EFFECT SPEED

[75] Inventors: Masashi Mizukoshi; Shinji Ikeda, both of Susono, Japan

[73] Assignee: Toyota Jidosha Kabushiki Kaisha, Aichi-ken, Japan

[21] Appl. No.: 70,104

[22] Filed: Jun. 1, 1993

[30] Foreign Application Priority Data

| Jun. 19, 1992 | [JP] | Japan | 4-185964 |
| Jun. 19, 1992 | [JP] | Japan | 4-185965 |
| Jun. 26, 1992 | [JP] | Japan | 4-192978 |

[51] Int. Cl.$^6$ .......................... G01S 13/60; G01S 13/64
[52] U.S. Cl. .................. 364/571.01; 324/161; 364/565; 367/91
[58] Field of Search ............... 364/565, 426.01, 364/426.02, 426.03, 426.04, 571.01, 550; 367/91; 342/70, 71, 104; 324/160, 161

[56] References Cited

U.S. PATENT DOCUMENTS

| 3,701,568 | 10/1972 | Lewis et al. |
| 4,125,825 | 11/1978 | Takeuchi et al. |
| 4,346,774 | 8/1982 | Hirota et al. |
| 4,366,546 | 12/1982 | Tachibana et al. ............... 364/426.02 |
| 4,414,548 | 11/1983 | Carpenter et al. .................... 342/70 X |
| 4,689,624 | 8/1987 | Kago et al. ............................. 367/91 X |
| 4,778,223 | 10/1988 | Inoue . |
| 4,893,287 | 1/1990 | Stratton et al. |
| 4,942,558 | 7/1990 | Hiniker et al. ............................. 367/91 |
| 4,969,100 | 11/1990 | Takata et al. ....................... 364/565 X |
| 5,016,017 | 5/1991 | Kodera et al. ........................... 342/106 |
| 5,097,453 | 11/1992 | Kobayashi et al. . |
| 5,371,718 | 12/1994 | Ikeda et al. ............................... 367/91 |

FOREIGN PATENT DOCUMENTS

| 0188906 | 7/1986 | European Pat. Off. . |
| 3540426 | 5/1986 | Germany . |
| 4231192A1 | 4/1993 | Germany . |
| 61-14586 | 1/1986 | Japan . |
| 63-046961 | 2/1988 | Japan . |
| 2-287183 | 11/1990 | Japan . |

Primary Examiner—James P. Trammell
Assistant Examiner—Edward Pipala
Attorney, Agent, or Firm—Oliff & Berridge

[57] ABSTRACT

The apparatus has a signal processor for determining the ground speed of a motor vehicle on the basis of the frequency of a wave transmitted from a transmitter and the frequency of the wave reflected by the ground surface and received by a receiver. The signal processor includes a relationship obtaining device for obtaining a relationship between an estimated vehicle speed obtained on the basis of the speed of a vehicle wheel, and a provisional speed determined on the basis of the frequencies of the transmitted and reflected waves, when the vehicle is in a steady running state in which the estimated vehicle speed accurately represents the actual vehicle speed. The signal processor determines the final vehicle speed on the basis of the obtained relationship.

20 Claims, 14 Drawing Sheets

FIG. 6

| RAM | |
|---|---|
| TIME t(i) | 54-1 |
| TIME t(i-1) | 54-2 |
| PERIOD T | 54-3 |
| PEAK VOLTAGE Vp | 54-4 |
| ESTIMATED VEHICLE SPEED VSO | 54-5 |
| PROVISIONAL VEHICLE SPEED VPRV | 54-6 |
| PRESENT FINAL VEHICLE SPEED VFNL(i) | 54-7 |
| LAST FINAL VEHICLE SPEED VFNL(i-1) | 54-8 |
| CUMULATIVE ERROR ERR | 54-9 |
| COMPENSATING COEFFICIENT K | 54-10 |
| ADJUSTING VALUE $\Delta K$ | 54-11 |
| VALUE i | 54-12 |
| VALUE j | 54-13 |
| COUNT CC | 54-14 |

(RAM: 54)

VEHICLE SPEED SENSOR UTILIZING RELATIONSHIP BETWEEN VEHICLE WHEEL SPEED AND DOPPLER-EFFECT SPEED

BACKGROUND OF THE INVENTION

1. Field of the Invention

The present invention relates in general to a Doppler-effect speed detecting apparatus adapted to detect or determine the ground speed of a motor vehicle, according to a Doppler effect or Doppler shift of waves transmitted and received by respective transmitter and receiver, and more particularly to techniques for improving the detecting accuracy of the apparatus.

2. Discussion of the Related Art

In a motor vehicle, the detection or determination of the running speed is necessary, for effecting an anti-lock or anti-skid control of braking forces applied to the vehicle wheels, for example. Conventionally, the vehicle running speed is estimated on the basis of rotating speeds of the wheels detected by appropriate wheel speed sensors. An example of such vehicle speed estimating means is disclosed in U.S. Pat. No. 4,778,223.

However, the accuracy of estimation of the vehicle speed on the basis of the detected wheel speeds is not satisfactorily high when the vehicle is running in a transient state, with brake application or rapid acceleration, for example. The vehicle speed estimating means utilizing the wheel speed sensors has another drawback. Namely, the actual running speed (ground speed) of the vehicle may deviate from the detected wheel speed due to a change in the diameter of the tire of the wheel during use of the vehicle.

In the light of the above drawback of the wheel speed sensors to determine the vehicle speed, there has been proposed the use of a Doppler-effect vehicle ground-speed detecting apparatus, which has (a) a transmitter for transmitting a wave (e.g., ultrasonic wave) toward the ground or road surface, (b) a receiver for receiving a portion of the transmitted wave reflected by the ground surface, and (c) a signal processor for determining the ground speed of the vehicle, according to a Doppler shift or Doppler effect, on the basis of the frequencies of the transmitted and received waves. An example of the apparatus of this type is disclosed in JP-A-2-287183 (published Nov. 27, 1990).

The Doppler-effect vehicle speed detecting or sensing apparatus utilizes transmitted and reflected waves which have components parallel to the running direction of the vehicle. The apparatus determines the running speed of the vehicle relative to the ground surface, on the basis of a Doppler shift of the frequency of the wave reflected by the ground surface with respect to that of the transmitted wave. The wave transmitter and receivers are attached to the body of the vehicle such that the boresight of the transmitter and receivers is angularly oriented relative to the vehicle running direction.

As described in the above-identified publication JP-A-2-287183, the apparatus is designed to determine the ground speed of the vehicle on the basis of the frequencies of the waves transmitted and received by the transmitter and receiver, on an assumption that the boresight or angle of the transmitter and receiver relative to the vehicle running direction is held constant. However, the boresight may differ on individual motor vehicles due to positioning error of the transmitter and receiver. Further, the boresight of the transmitter and receiver on a given vehicle may vary from time to time due to a change in the pitch angle of the vehicle, which arises from a change in the load distribution on the vehicle, which in turn takes place when the vehicle is decelerated with an abrupt brake applied thereto, for example. These varying or fluctuating factors as well as other adverse factors associated with the Doppler-effect speed detection lead to inaccuracy of the speed detection or determination by the apparatus during running of the vehicle in a transient state, with abrupt brake application or rapid acceleration, for example.

The Doppler-effect speed detecting apparatus as disclosed in the above-identified publication JP-A-2-287183 has signal generating means for generating a Doppler-frequency signal indicative of a Doppler frequency which is determined by the frequencies of the transmitted and reflected waves. This apparatus is adapted to determine the ground speed of the vehicle on the basis of the frequency of the Doppler-frequency signal, which is detected by counting the number of pulses of the Doppler-frequency signal per unit time.

In another type of Doppler-effect vehicle speed sensor proposed by the assignee of the present application, the vehicle ground speed is determined on the basis of the period of the Doppler-frequency signal, e.g., the period of each pulse of the signal, or the total period of a predetermined number of pulses of the signal. This type of apparatus is advantageous in terms of operating response, namely, assures relatively high response to a change in the vehicle speed. An example of the apparatus which uses the period of the Doppler-frequency signal to determine the vehicle speed is disclosed in co-pending application Ser. No. 07/942,776 filed Sep. 10, 1992, now U.S. Pat. No. 5,373,446, in which a reference range of the period of the Doppler-frequency signal is used to determine the vehicle speed. More specifically described, the reference range is determined from time to time by at least one previously obtained value of the period of the Doppler-frequency signal, such that the reference range has a constant width. If the presently detected value of the period is held within the determined reference range, the detected value is determined as the final value of the period. If the presently detected value is outside the reference range, the detected value is suitably adjusted or changed to obtain the final value. This adjustment is made on a concept that the deviation of the presently detected value of the period of the Doppler-frequency signal from the determined reference range was caused by external disturbances or noises associated with the detecting apparatus, and that some adjustment or compensation of the presently detected value is necessary to determine the final value.

However, the above type of the apparatus suffers from a problem when the actual vehicle speed is relatively low. Explained more particularly, the frequency of the Doppler-frequency signal decreases while the period of the signal increases, as the actual vehicle speed is lowered. On the other hand, the width of the reference range is kept constant irrespective of the actual vehicle speed. Consequently, when the actual vehicle speed is lowered down to 5 km/h, for example, the period of the Doppler-frequency signal is accordingly increased, and the presently detected value of the period may deviate from the reference range which is determined by the previously obtained value or values of the period, while in fact the presently detected value of the period is accurate. In this event, the presently detected value is unnecessarily and undesirably adjusted according to a predetermined rule to obtain the final value which is used to determine the vehicle speed. Thus, the apparatus is not capable of accurately detecting or determining the ground speed of the vehicle when the actual ground speed is relatively low.

SUMMARY OF THE INVENTION

It is therefore a first object of the present invention to provide a Doppler-effect vehicle speed detecting apparatus capable of accurate and reliable determination of the ground speed of a motor vehicle.

It is a second object of the present invention to provide a Doppler-effect vehicle speed detecting apparatus which assures accurate detection of the vehicle speed even in a transient running state of the vehicle in which sufficiently accurate detection of the ground speed of the vehicle is not possible on the basis of the Doppler effect.

It is a third object of the present invention to provide a Doppler-effect vehicle speed detecting apparatus which is adapted to determine the vehicle speed on the basis of the period of the Doppler-frequency signal and which assures accurate determination of the vehicle speed even when the actual vehicle speed is relatively low.

The above first object may be achieved according to a first aspect of the present invention, which provides a Doppler-effect speed detecting apparatus for detecting a ground speed of a motor vehicle, having (a) a transmitter for transmitting a wave toward a ground surface, (b) a receiver for receiving a portion of the transmitted wave which is reflected by the ground surface, and (c) a signal processor for determining the ground speed of the vehicle on the basis of a frequency of the transmitted wave and a frequency of the reflected wave, the apparatus being characterized in that vehicle speed estimating means is provided to obtain an estimated vehicle speed on the basis of a rotating speed of a wheel of the vehicle, and that the signal processor comprises relationship obtaining means for obtaining a relationship between the estimated vehicle speed and a provisional vehicle speed determined on the basis of the frequencies of the transmitted and reflected waves, and final-speed determining means for determining a final vehicle speed as the ground speed, on the basis of the relationship obtained in the steady running state.

In the Doppler-effect speed detecting apparatus according to the above first aspect of the invention, the final vehicle speed is determined by not only the provisional vehicle speed determined on the basis of the frequencies of the transmitted and reflected waves, but also the estimated vehicle speed obtained by the vehicle speed estimating means. For increased accuracy of determination of the final vehicle speed, the relationship between the estimated vehicle speed and the provisional vehicle sped is preferably obtained in a steady running state of the vehicle in which the estimated vehicle speed accurately represents the ground speed of the vehicle. This arrangement is based on the fact that the vehicle speed as estimated on the basis of the detected wheel speed coincides with the actual ground speed of the vehicle, with relatively high accuracy, while the vehicle is running in the steady state with substantially no slip of the wheel, for example. Consequently, the final vehicle speed may be accurately determined based on the relationship between the estimated vehicle speed and the provisional Doppler-effect vehicle speed, which is obtained in the steady running state.

While the final vehicle speed during the steady running state may be determined on the basis of the obtained relationship, the utilization of this relationship obtained in the steady running state of the vehicle is particularly effective to determine the final vehicle speed during a transient running state of the vehicle in which the estimated vehicle speed does not accurately represent the ground speed of the vehicle. This aspect of the invention may achieve the second object indicated above.

That is, the above second object may be achieved according to a second aspect of this invention, which provides a Doppler-effect speed detecting apparatus for detecting a ground speed of a motor vehicle, having (a) a transmitter for transmitting a wave toward a ground surface, (b) a receiver for receiving a portion of the transmitted wave which is reflected by the ground surface, and (c) a signal processor for determining the ground speed of the vehicle, according to a Doppler effect on the basis of a frequency of the transmitted wave and a frequency of the reflected wave, wherein vehicle speed estimating means is provided for obtaining an estimated vehicle speed on the basis of a rotating speed of a wheel of the vehicle, and the signal processor comprises relationship obtaining means for obtaining a relationship between the estimated vehicle speed and a provisional vehicle speed determined on the basis of the frequencies of the transmitted and reflected waves, when the vehicle is in a steady running state in which the estimated vehicle speed accurately represents the ground speed of the vehicle, and wherein the signal processor further comprises final-speed determining means for determining a final vehicle speed as the ground speed, in the steady running state and in a transient running state of the vehicle in which the estimated vehicle speed does not accurately represent the ground speed of the vehicle. The final-speed determining means determines, at least when the vehicle is in the transient running state, the final vehicle speed on the basis of the relationship obtained in the steady running state which precedes the transient running state.

In the vehicle speed detecting apparatus constructed according to the second aspect of the invention as described above, the ground speed (final speed) of the vehicle running in the steady state can be accurately determined based on the estimated or provisional vehicle speed, since the estimated or provisional vehicle speed in the steady running state is not influenced by the fluctuating factors such as slipping of the vehicle wheels or variation in the angle of the transmitter and receiver relative to the road surface. However, the final vehicle speed in the steady running state may also be determined on the basis of the relationship between the estimated and provisional vehicle speeds which is obtained in that steady running state.

In the transient running state, the vehicle speed is determined on the basis of the relationship between the estimated and provisional vehicle speeds, which relationship was obtained in the preceding steady running state. That is, the vehicle speed is determined on the basis of the estimated vehicle speed as well as the provisional vehicle speed. Since the estimated and provisional vehicle speeds used to determine the final vehicle speed in the transient running state were obtained in the preceding steady running state, the vehicle speed during running of the vehicle in the transient state can also be determined with high accuracy, based on the reliable relationship between the estimated and provisional vehicle speeds.

For example, the steady running state of the vehicle may be detected by detecting the absence of braking of the vehicle, or by detecting that the deceleration or acceleration value of the vehicle is not excessive.

The relationship obtaining means may obtain the relationship between the estimated and provisional speeds, for each pair of values of the estimated and provisional speeds which is obtained at a predetermined time interval. In this case, the relationship between the present pair of the estimated and provisional vehicle speed values may be determined independently of the last pair of values, or the relationship may be updated by changing the last obtained relationship based on the presently obtained pair of values of the estimated and provisional vehicle speeds. Alternatively, a single relationship may be obtained for two or more successive pairs of values of the estimated and provisional speeds which are obtained at the predetermined time interval.

In one preferred form of the present apparatus described above, the relationship obtaining means of the signal processor is adapted to obtain as the relationship a compensating coefficient when the vehicle is in the steady running state. In this case, when the vehicle is in the transient running state, the final-speed determining means calculates the final vehicle speed by multiplying the provisional vehicle speed by the compensating coefficient which was obtained in the steady running state which precedes the transient running state.

The above form of the invention which utilizes the compensating coefficient is based on a fact that the provisional vehicle speed determined on the basis of the frequencies of the transmitted and reflected waves is generally substantially or almost proportional with the actual vehicle speed when there exists some detecting error of the provisional vehicle speed due to fluctuating factors associated with the angle of the transmitter and receiver with respect to the vehicle running direction. On this fact, the compensating coefficient by which the provisional vehicle speed is multiplied to obtain the final vehicle speed is obtained when the vehicle is running in the steady state. This compensating coefficient is used to determine at least the final vehicle speed during running of the vehicle in the transient state following the steady running state in which the compensating coefficient was obtained.

In another form of the present apparatus, the relationship obtaining means of the signal processor is adapted to obtain as the relationship a speed difference $\Delta V$ between the estimated and provisional speeds when the vehicle is in the steady running state. In this case, the final-speed determining means calculates the final vehicle speed in the transient running state of the vehicle, by adding to the presently obtained provisional vehicle speed the obtained speed difference $\Delta V$ which was obtained in the steady running state which precedes the transient running state.

However, the above form of the apparatus utilizing the compensating coefficient (i.e., ratio of the estimated and provisional vehicle speeds) is advantageous over the above form of the apparatus which uses the speed difference $\Delta V$ between the estimated and provisional speeds. More specifically, in the apparatus utilizing the compensating coefficient, the final vehicle speed determined by the final-speed determining means in the transient running state substantially coincides with the actual vehicle speed as indicated in the graph of FIG. 11. In the apparatus using the speed difference, on the other hand, the final vehicle speed determined in the transient running state tends to deviate from the actual vehicle speed as indicated in the graph of FIG. 10, since the speed difference $\Delta V$ rather than the compensating coefficient (ratio) is used to compensate the provisional vehicle speed to obtain the final vehicle speed.

Thus, the preferred form of the apparatus which uses the compensating coefficient assures higher accuracy of detection of the vehicle speed even in the transient running condition of the vehicle, with a minimum influence of the fluctuating factors associated with the detecting apparatus such as variation in the angle of the transmitter and receiver.

The relationship obtaining means may be adapted to update the compensating coefficient by dividing the last value of the estimated vehicle speed by the last value of the provisional vehicle speed while the vehicle is in the steady running state. In this case, the last value of the compensating coefficient updated in the steady running state is used to determine the vehicle speed in the transient running state following the steady running state.

Alternatively, the relationship obtaining means may be adapted to update the compensating coefficient as follows. That is, the relationship obtaining means obtains, in the steady running state of the vehicle, a difference by subtracting a last value of the final vehicle speed from a present value of the estimated vehicle speed, and also obtains a quotient by dividing the difference by the present value of the estimated vehicle speed. In the steady running state of the vehicle, the relationship obtaining means updates the compensating coefficient by adding the quotient to a present value of the compensating coefficient. In the transient running state, the final-speed determining means calculates the final vehicle speed by multiplying the provisional vehicle speed by a last value of the compensating coefficient updated in the steady running state which precedes the transient running state.

In the steady running state of the vehicle, the final-speed determining means need not determine the final vehicle speed by multiplying the provisional vehicle speed by the compensating coefficient, as indicated above. For example, the estimated vehicle speed may be determined as the final vehicle speed when the vehicle is in the steady running state.

According a further preferred form of the present apparatus, the signal processor further comprises preventing means for preventing the final-speed determining means from determining, in said transient state of the vehicle, the final vehicle speed on the basis of the relationship which was obtained in the steady running state of the vehicle under an influence of the provisional vehicle speed obtained when an output level of the receiver is lower than a predetermined threshold.

In the above form of the apparatus, the preventing means prevents the final-speed determining means from determining the final speed on the relationship influenced by the provisional vehicle speed obtained when the output level of the receiver is lower than the predetermined threshold. The output level of the receiver may drop below the predetermined threshold when the vehicle passes a water puddle or plash on the road surface. The above arrangement prevents an adverse influence of an excessively low output level of the receiver on the accuracy of determination of the final vehicle speed in the transient running state of the vehicle. Thus, the detecting apparatus is capable of accurately determining the final vehicle speed even in the transient running state, irrespective of a variation in the output level of the receiver.

The preventing means may totally inhibit the final-speed determining means from determining the final vehicle speed on the basis of the relationship if the output level of the receiver was lower than the predetermined threshold in the steady running state in which the relationship was obtained. In this case, the preventing means requires the final-speed determining means to determine the provisional vehicle speed as the final vehicle speed in the transient running state which follows the transient running state. Alternatively, the preventing means may inhibit the relationship obtaining means from updating the relationship if the output level of the receiver is lower than the threshold. In this case, the last obtained relationship is maintained, and the final-speed determining means determines the final vehicle speed on the basis of the maintained relationship.

Further alternatively, the preventing means may permit the relationship determining means to obtain the relationship only when the output level of the receiver is not lower than the predetermined threshold. In this case, the relationship obtaining means obtains relationship for only each of those pairs of values of the estimated and provisional vehicle speeds which are obtained when the receiver output level is not lower than the threshold. Further, the preventing means may inhibit the final-speed determining means from using the relationships which were obtained under an influence of the estimated and provisional speed values obtained when the receiver output level was lower than the threshold.

In the case where the present relationship is obtained by changing the last relationship, the preventing means may inhibit the relationship obtaining means from changing the last relationship to obtain the present relationship, namely, inhibit the relationship obtaining means from updating the relationship when the output level of the receiver is lower than the threshold. In this case, the relationship obtained last in the steady running state when the output level is not lower than the threshold is used in the transient running state.

In one specific arrangement according to the above form of the apparatus which includes the preventing means, the relationship obtaining means of the signal processor obtains as the relationship a compensating coefficient when the vehicle is in the steady running state, and the final-speed determining means calculates, when the vehicle is in the transient running state, the final vehicle speed by multiplying the provisional vehicle speed by a last value of the compensating coefficient obtained in the steady running state which precedes the transient running state. Further, the preventing means permits, if the output level is not lower than the predetermined threshold, the relationship obtaining means to obtain, in the steady running state of the vehicle, a difference by subtracting a last value of the final vehicle speed from a present value of the estimated vehicle speed, and a quotient by dividing the difference by the present value of the estimated vehicle speed, so that the relationship obtaining means updates the compensating coefficient by adding the quotient to a present value of the compensating coefficient when the vehicle is in the steady running state and when the output level is not lower than the predetermined threshold. If the output level of the receiver is lower than the predetermined threshold, the preventing means requires the relationship obtaining means to maintain a last value of the compensating coefficient updated when the output level is not lower than the predetermined threshold.

The above third object may be achieved according to a third aspect of this invention, which provides a Doppler-effect speed detecting apparatus for detecting a ground speed of a motor vehicle, having (a) a transmitter for transmitting a wave toward a ground surface, (b) a receiver for receiving a portion of the transmitted wave which is reflected by the ground surface, and (c) signal generating means for generating a Doppler-frequency signal indicative of a Doppler frequency determined by the frequencies of the transmitted and reflected waves, and (d) a signal processor for detecting a present value of a period of the Doppler frequency signal as a provisional value of the period, determining the provisional value of the period as a final value thereof if the provisional value is held within a reference range determined by at least one previously obtained value of the period, adjusting the provisional value to obtain the final value if the provisional value is outside the reference range, and determining the ground speed of the vehicle on the basis of the final value of the period, wherein the signal processor comprising range determining means for defining as the reference range a variable reference range such that the reference range is wider when the ground speed of the vehicle previously determined by the signal processor is relatively low than when the previously determined ground speed is relatively high.

In the Doppler-effect speed detecting apparatus constructed according to the third aspect of this invention, the reference range used to determine the final value of the period of the Doppler-frequency signal is made wider when the previously determined ground speed of the vehicle is relatively low than when the previously determined ground speed is relatively high. This arrangement prevents an undesirable phenomenon that the period of the Doppler-frequency signal as detected by the signal processor becomes out of the reference range, solely because the actual ground speed of the vehicle falls to a considerably low level. In other words, the reference range defined by the range determining means when the actual vehicle speed is low is wide enough to cover the presently detected value or provisional value of the period even when the actual vehicle speed is considerably low. Accordingly, the present arrangement avoids an improper adjustment of the provisional value of the period to obtain the final value used for determining the ground speed of the vehicle. Thus, the present apparatus assures accurate detection of the vehicle ground speed over the entire range of the vehicle speed.

The range determining means may determine an upper and a lower limit of the variable reference range, on the basis of at least one previously obtained value of the period of the Doppler-frequency signal. Therefore, these upper and lower limits change with the at least one previously obtained value of the period. For example, the at least one previously obtained value of the period may consist of one or more previously obtained provisional values of the period all before adjustment thereof to obtain the final values, or may consist of one or more previously obtained final values of the period.

In one preferred form of the apparatus according to the above third aspect of this invention, the range determining means determines an upper limit and a lower limit which define a first range used when the previously determined ground speed of the vehicle is higher than a predetermined lower limit. These upper and lower limits have a constant difference to define a constant width of the first range and vary with a change in the at least one previously obtained value of the period of the Doppler-frequency signal as indicated above. Further, the range determining means defines a second range which is used when the previously determined ground speed of the vehicle is not higher than the predetermined lower limit. The second range has an infinitely large width so that the presently obtained provisional value of the period is necessarily determined as the final value thereof when the previously determined ground speed of the vehicle is not higher than the predetermined lower limit.

In an alternative form of the apparatus, the range determining means determines a first upper limit and a first lower limit which define a first range used when the previously determined ground speed of the vehicle is higher than a predetermined lower limit. These first upper and lower limits have a constant difference to define a first constant width of the first range. The range determining means also determine a second upper limit and a second lower limit which define a second range used when the previously determined ground speed is not higher than the predetermined lower limit. These second upper and lower limits have a constant difference to define a second constant width of the second range smaller than the first constant width. The first and second upper and lower limits vary with a change in the at least one previously obtained value of the period of the Doppler-frequency signal, as described above.

When the provisional value of the period is outside the reference range, the provisional value may be adjusted or changed to a predetermined value within the reference range, to determine the predetermined value as the final value of the period. Alternatively, the provisional value is ignored, and the final value is determined based on at least one previously obtained value of the period. For example, the provisional value may be replaced by the last final value or an average of a predetermined number of the previously obtained final values.

BRIEF DESCRIPTION OF THE DRAWINGS

The above and optional objects, features and advantages of this invention will be better understood by reading the following detailed description of presently preferred embodiments of the invention, when considered in connection with the accompanying drawings, in which:

FIG. 6 is a view indicating memory areas in a random-access memory of the computer for storing various sorts of data;

DETAILED DESCRIPTION OF THE PREFERRED EMBODIMENTS

Figure 1:
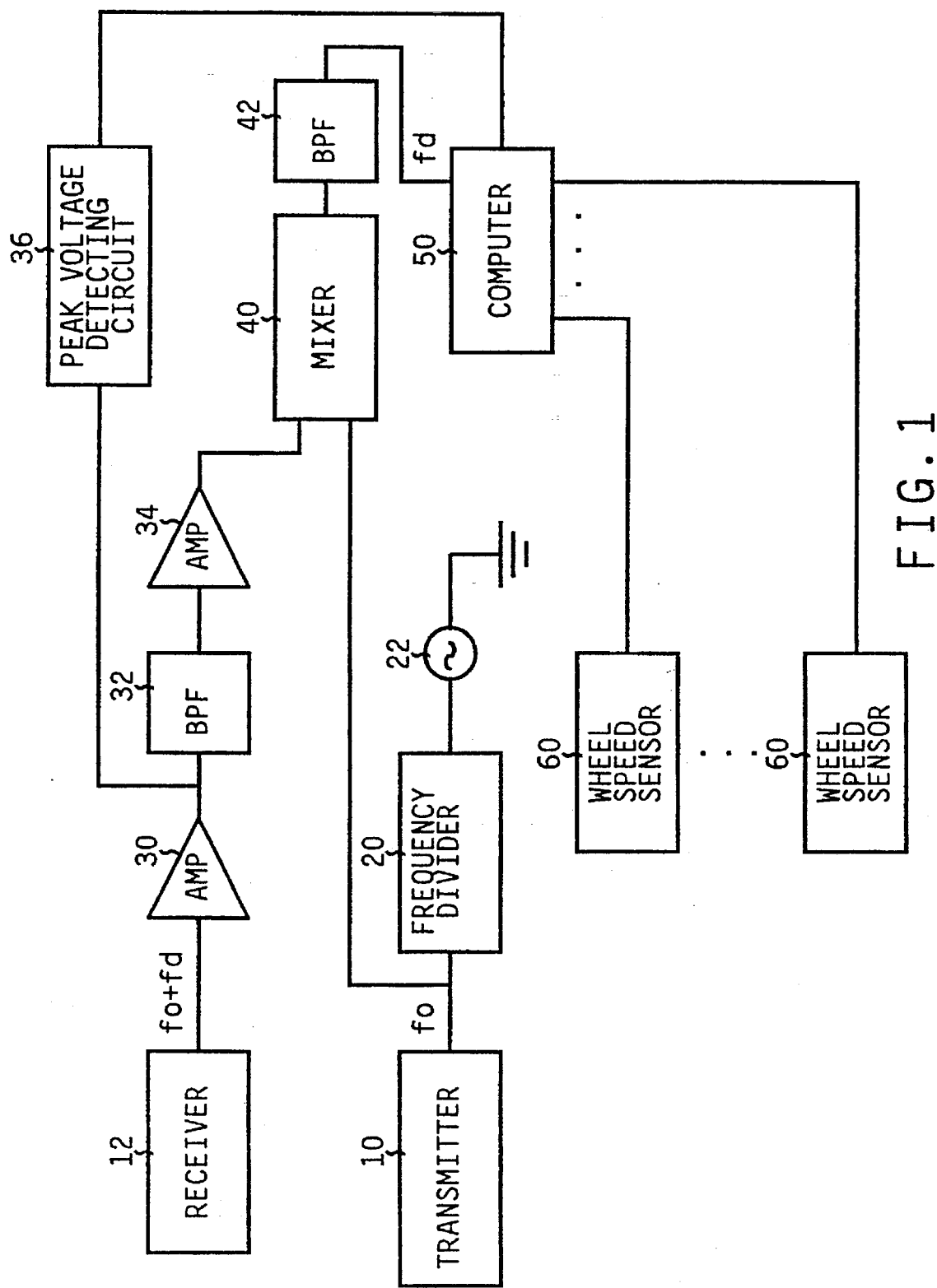
FIG. 1 is a schematic block diagram depicting a Doppler-effect vehicle-speed detecting apparatus constructed according to a first embodiment of the present invention.

Referring first to the schematic block diagram of FIG. 1, there is shown one embodiment of the Doppler-effect vehicle speed detecting apparatus of the present invention, which is adapted to detect or determine the ground speed of a motor vehicle relative to the ground or road surface on which the vehicle is running. The apparatus includes a transmitter 10 and a receiver 12, both of which use piezo-electric elements as means for conversion between sound waves signals and electric signals. The transmitter 10 and the receiver 12 are attached to the underside of the vehicle body such that the boresights of the transmitter and receiver 10, 12 are oriented in a forward running direction of the vehicle, at a predetermined angle θ (e.g., 45°) relative to the ground surface.

The boresight of the transmitter 10 is a path of propagation of a ultrasonic wave generated by the transmitter 10 toward the ground surface. The transmitter 10 generates the ultrasonic wave in response to a signal received from an oscillator 22 via a frequency divider 20. The oscillator 22 consists principally of a quartz crystal. On the other hand, the receiver 12 receives a portion of the ultrasonic wave which is generated by the transmitter 10 and reflected by the ground surface. The receiver 12 is connected to an amplifier 30, a band-pass filter 32 and another amplifier 34, in the order of description. In FIG. 1, the amplifiers 30, 34 are indicated as AMP while the band-pass filter 32 is indicated as BPF. The receiver 12 produces an electric output signal whose amplitude periodically changes with time. This output signal is first amplified by the amplifier 30, and then filtered by the band-pass filter 32 so as to eliminate noises included therein. The output of the band-pass filter 32 is again amplified by the second amplifier 34.

The output of the first amplifier 30 is connected to a peak voltage detecting circuit 36, so that the detecting circuit 36 detects from time to time a peak value of the periodically changing amplitude of an output voltage signal of the amplifier 30 (hereinafter referred to as "peak voltage" of the amplifier 30). The peak voltage detected by the detecting circuit 36 is applied to a signal processor in the form of a computer 50 which will be described.

The input of the transmitter 10 and the output of the second amplifier 34 are connected to the input of a mixer 40, so that the mixer 40 receives a signal whose frequency is equal to a frequency fo (hereinafter referred to as "transmitting frequency") of the ultrasonic wave generated by the transmitter 10, and a signal whose frequency is equal to a frequency fo+fd (hereinafter referred to as "receiving frequency") of the wave as received by the receiver 12. The difference fd between the transmitting frequency fo and the receiving frequency (fo+fd) corresponds to an amount of the Doppler shift. The mixer 40 receiving these two signals generates an output which is a composite wave consisting of a low-frequency component whose frequency is equal to the difference fd (Doppler frequency) indicated above, and a high-frequency component whose frequency is equal to a sum (2·fo+fd) of the frequencies fo and (fo+fd) of the two signals received by the mixer 40. The frequencies fd and (2·fo+fd) are beat frequencies of the transmitting and receiving frequencies, as well known in the art.

The composite wave generated by the mixer 40 is applied to a second band-pass filter 42 also indicated as BPF in FIG. 1), which in turn passes only the low-frequency component of the received composite wave. The low-frequency component is applied to the computer 50, as a Doppler-shift signal or Doppler-frequency signal (sine wave signal).

Figure 2:
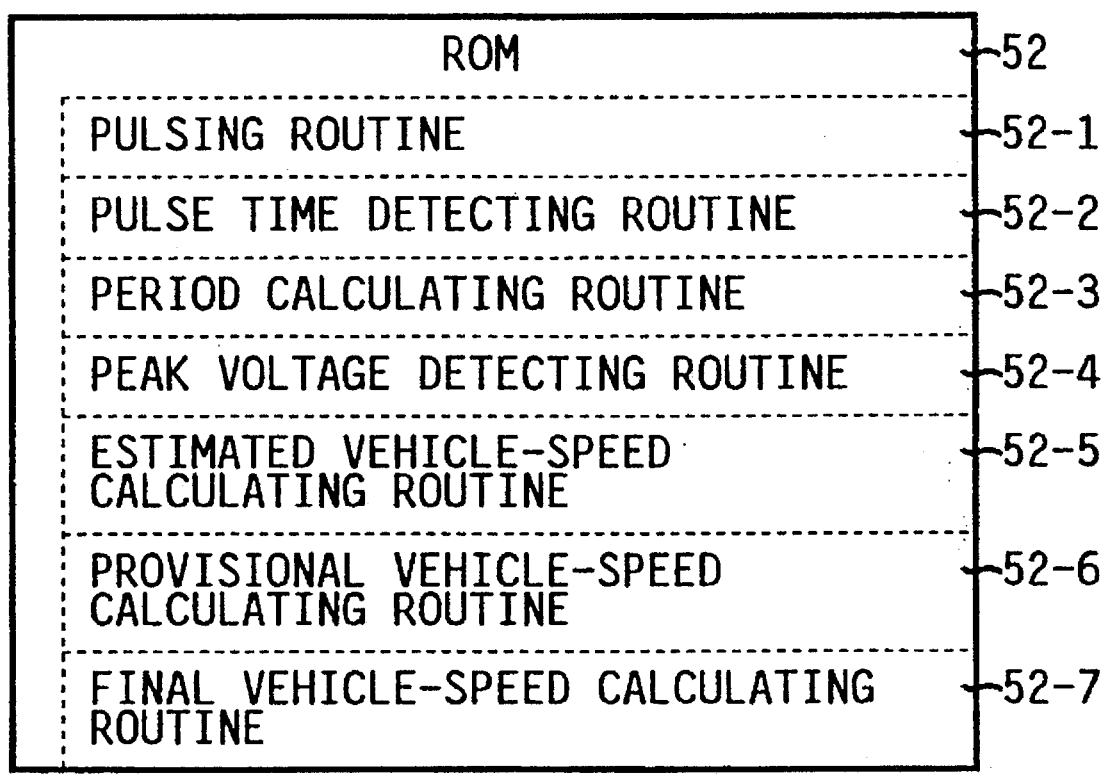
FIG. 2 is a view indicating control programs for various routines stored in a read-only memory of a computer used in the first embodiment.
Figure 3:
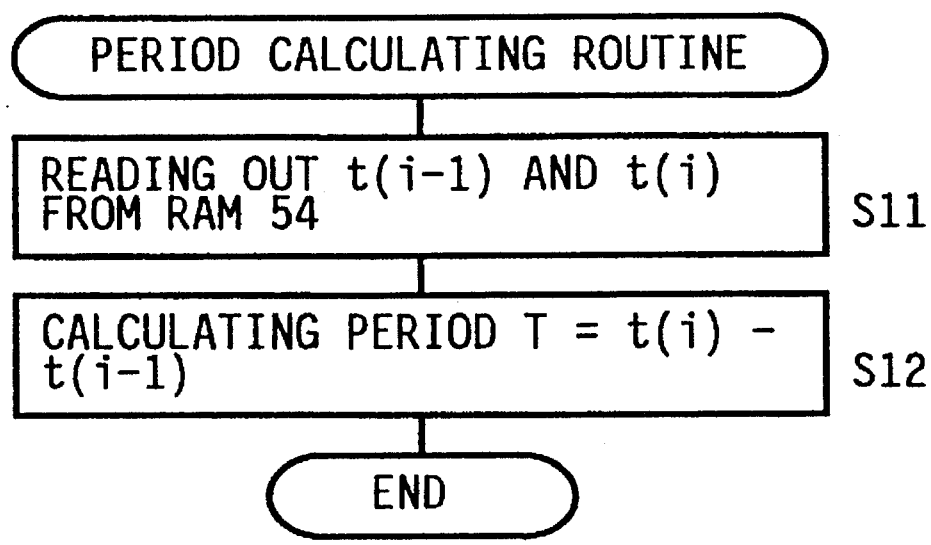
FIG. 3 is a flow chart illustrating the routine for calculating the period of pulses obtained from a transmitter of the apparatus of FIG. 1.
Figure 4:
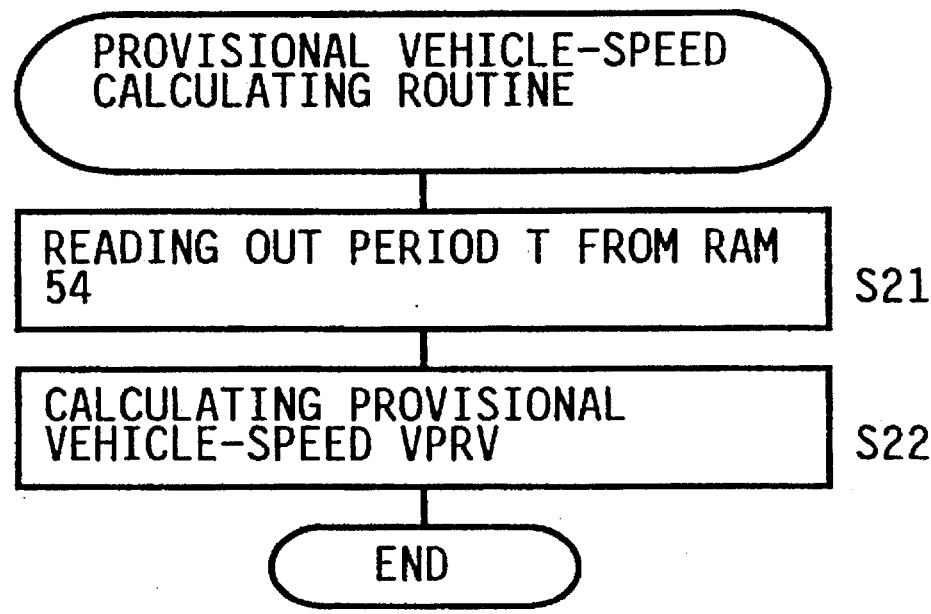
FIG. 4 is a flow chart illustrating the routine for calculating a provisional vehicle speed according to the first embodiment.

The computer 50 which functions as the signal processor of the present vehicle speed detecting apparatus incorporates a central processing unit (CPU), a read-only memory (ROM), a random-access memory (RAM) and a data bus interconnecting these elements. The ROM, which is indicated generally at 52 in FIG. 2, has various memory areas for storing various control programs. The memory areas of the ROM 52 include memory areas 52-1 through 52-7 which respectively store a pulsing routine, a pulse time detecting routine, a period calculating routine as illustrated in the flow chart of FIG. 3, a peak voltage detecting routine, an estimated vehicle-speed calculating routine, a provisional vehicle-speed calculating routine as illustrated in the flow chart of FIG. 4, and a final vehicle-speed calculating routine as illustrated in the flow chart of FIG. 5. The individual routines will be described.

The RAM of the computer 50, which is indicated generally at 54 in FIG. 6, has various memory areas including: a memory area 54-1 for storing data indicative of time t(i); a memory area 54-2 for storing data indicative of time t(i−1); a memory area 54-3 for storing data indicative of a period T of the output signal of the receiver 12 (having the receiving frequency fo+fd); a memory area 54-4 for storing data indicative of the peak voltage Vp of the output signal of the receiver 12; a memory area 54-5 for storing data indicative of an estimated vehicle speed VSO; a memory area 54-6 for storing data indicative of a provisional vehicle speed VPRV; a memory area 54-7 for storing data indicative of a present final vehicle speed VFNL(i); a memory area 54-8 for storing data indicative of a last final vehicle speed VFNL(i−1); a memory area 54-9 for storing data indicative of a cumulative error ERR; a memory area 54-10 for storing data indicative of a compensating coefficient K; a memory area 54-11 for storing data indicative of a compensating amount ΔK; a memory area 54-12 for storing data indicative of a value i; a memory area 54-13 for storing data indicative of a value j; and a memory area 54-14 for storing data indicative of a count CC. The contents of the memory areas 54-1 through 54-14 will become apparent from the following description. The data stored in these memory areas 54-1 through 54-14 are updated each time new data are entered therein.

The pulsing routine stored in the memory area 52-1 of the ROM 52 is provided to convert the Doppler-frequency signal received from the second band-pass filter 42, into pulses having a predetermined amplitude.

The pulse time detecting routine stored in the memory area 52-1 of the ROM 52 is provided to detect points of time t(i) at which the individual pulses are obtained by the pulsing routine. The time t(i) of the present pulse and the time t(i−1) of the preceding pulse are stored in the memory areas 54-1 and 54-2 of the RAM 54, respectively.

The period calculating routine stored in the memory area 52-3 of the ROM 52 is provided to calculate the period T of the Doppler-frequency signal (output signal of the receiver 12). Described more specifically by reference to the flow chart of FIG. 3, step S11 is first implemented to read out the times t(i) and t(i−1) of the two successive pulses from the memory areas 54-1 and 54-2 of the RAM 54. Step S11 is followed by step S12 to subtract the time t(i−1) of the preceding pulse from the time t(i) of the present pulse, for thereby calculating the period T of the Doppler-frequency signal. The calculated period T is stored in the memory area 54-3 of the RAM 54.

The peak voltage detecting routine stored in the memory area 52-4 of the ROM 52 is provided to determine the peak voltage Vp of the output signal of the receiver 12 on the basis of the output signal of the peak voltage detecting circuit 36 (that is, on the basis of the peak voltage of the output signal of the amplifier 30). The peak voltage Vp determined from time to time by the peak voltage detecting routine is stored in the memory area 54-4 of the ROM 54.

The estimated vehicle-speed calculating routine stored in the memory area 52-5 of the ROM 52 is provided to calculate the estimated speed VSO(i) of the vehicle on the basis of the speeds of four wheels (right and left front wheels, and right and left rear wheels) of the vehicle detected by respective speed sensors 60. More specifically, the routine is adapted to first obtain the following three wheel speed values: (1) a highest one of the currently detected speeds of the four wheels (wheel speeds detected in the present cycle); (2) a maximum wheel speed calculated on the basis of the last estimated vehicle speed VSO(i−1); and (3) a minimum wheel speed calculated on the basis of the lasted estimated vehicle speed VSO(i−1). The calculation of the maximum and minimum wheel speeds will be described. Then, an intermediate value of the above three values is determined as the current estimated vehicle speed VSO(i). The obtained speed VSO(i) is stored in the memory area 54-5 of the RAM 54.

The maximum wheel speed indicated at (2) above is calculated as VSO(i−1)+GACC·α, while the minimum wheel speed indicated at (3) above is calculated as VSO(I−1)—GDEC·α. GACC and GDEC represent upper limits (predetermined constants) of acceleration and deceleration of the vehicle, respectively, while α represents a sampling interval of the estimated vehicle speed, that is, the cycle time of the final vehicle-speed calculating routine of FIG. 5.

The provisional vehicle-speed calculating routine stored in the memory area 52-6 of the ROM 52 is provided to calculate the provisional vehicle speed VPRV. As shown in the flow chart of FIG. 4, the routine consists of step S21 to read out the period T of the output signal of the receiver 12 from the memory area 54-3 of the RAM 54, and step S22 to calculate the provisional vehicle speed VPRV on the basis of the period T. The calculated provisional vehicle speed VPRV is stored in the memory area 54-6 of the RAM 54.

Figure 5:
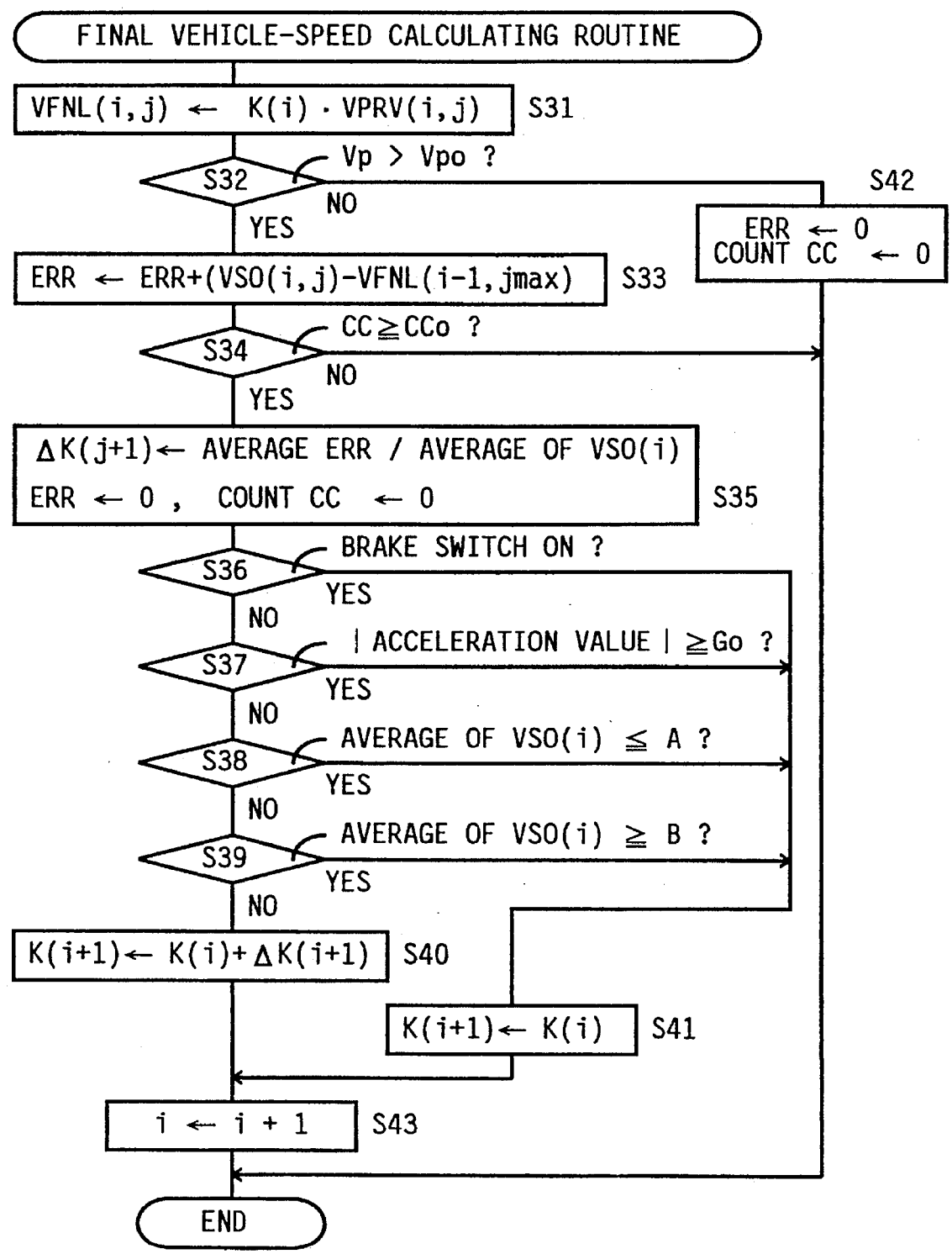
FIG. 5 is a flow chart illustrating the routine for calculating a final vehicle speed according to the first embodiment.

The final vehicle-speed calculating routine stored in the memory area 52-7 of the ROM 52 is provided to calculate final vehicle speed VFNL as illustrated in the flow chart of FIG. 5. Before describing the routine in detail by reference to FIG. 5, the concept of the routine will be explained regarding an operation when the level of the output signal of the receiver 12 is sufficiently high, that is, when the peak voltage Vp received from the circuit 36 is higher than a predetermined threshold μ.

Each time the routine is executed, the provisional vehicle speed VPRV(i) is read out from the memory area 54-6 of the RAM 54, and the final value VFNL(i) of the vehicle speed (ground speed of the vehicle) is calculated by multiplying the provisional vehicle speed VPRV by the currently effective compensating coefficient K(i). The compensating coefficient K(i) is determined differently in steady and transient running states of the vehicle. The steady running state is defined as a state in which the estimated vehicle speed VSO(i) represents the actual ground speed of the vehicle with sufficiently high accuracy, with the vehicle running at a comparatively constant speed. The transient running state is defined as a state in which the estimated vehicle speed VSO(i) considerably deviates from the actual speed of the vehicle, with the vehicle speed changing at a comparatively high rate.

In the steady running state of the vehicle, an adjusting value ΔK for updating the compensating coefficient K(i) or obtaining the compensating coefficient K(i+1) used in the next cycle is calculated by first calculating a difference VSO(i)—VFNL(i−1) and then dividing the difference by VSO(i). The difference is calculated by subtracting the last final vehicle speed VFNL(i−1) stored in the memory area 54-8 from the present estimated vehicle speed VSO(i) stored in the memory area 54-5. The compensating coefficient K(i+1) used in the next cycle is determined by adding the calculated adjusting value ΔK to the present compensating coefficient K(i). In the transient running state of the vehicle, the final value of the compensating coefficient K at the end of the period of the last steady running state of the vehicle is used as the next compensating coefficient K(i+1).

The principle of calculating the final vehicle speed VFNL will be described.

The present embodiment of the invention is based on a fact that the final vehicle speed VFNL (i.e., the actual running speed of the vehicle relative to the ground surface) is proportional to the provisional vehicle speed VPRV, namely, an equation VFNL=K·VPRV is satisfied.

The following equations corresponding to respective cycles of execution of the routine of FIG. 5 are obtained from the above equation VFNL=K·VPRV:

$$VFNL(i) = K(i) \cdot VPRV(i)$$
$$VFNL(i - 1) = K(i - 1) \cdot VPRV(i - 1)$$
$$\vdots$$
$$VFNL(1) = K(1) \cdot VPRV(1)$$

In the present embodiment, the compensating coefficient K(i) used in the above equations is updated according to the following equation which uses the adjusting value ΔK(i):

$$K(i)=K(i-1)+\Delta K(i)$$

Although the adjusting value ΔK(i) for obtaining the updated or present compensating coefficient K(i) may be a predetermined constant which is a small value, the present embodiment is adapted to obtain the adjusting value ΔK(i) according to the following equation:

$$\Delta K(i)=[VSO(i)—VFNL(i-1)]/VSO(i)$$

The final vehicle-speed calculating routine of FIG. 5 is formulated according to the principle described above so that the compensating coefficient K for calculating the final vehicle speed VFNL from the provisional vehicle speed VPRV is updated only when the vehicle is running in the steady state, and is fixed at the last value at the end of the period of the last steady running state of the vehicle when the vehicle is running in the transient state.

Figure 7:
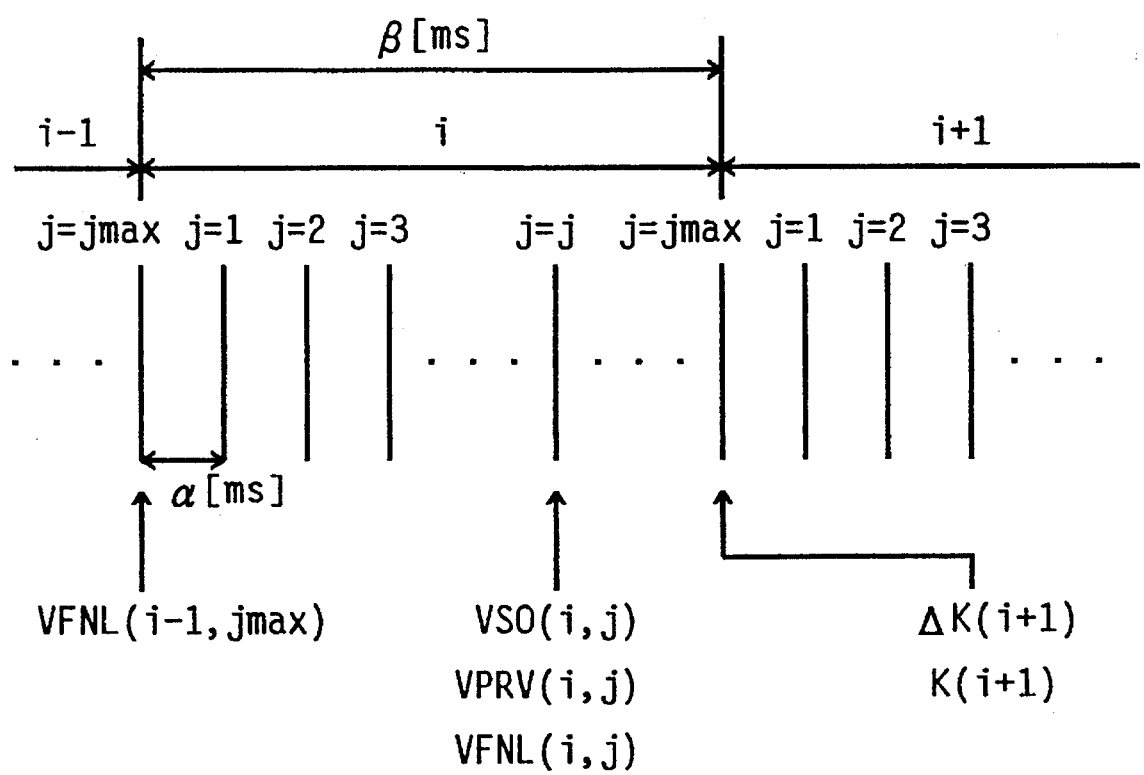
FIG. 7 is an illustration showing the cycle time α of the vehicle speed calculating routine of FIG. 5, and the time interval β for updating the adjusting value ΔK.

The present routine of FIG. 5 is executed at the cycle time α (ms), to update or calculate the estimated vehicle speed VSO, provisional vehicle speed VPRV and final vehicle speed VFNL at the time interval α. However, the compensating coefficient K is updated at a time interval β (ms) longer than the cycle time α of the routine of FIG. 5, as indicated in FIG. 7. Therefore, the compensating coefficient K(i) remains constant for the time duration β during which the speed values VSO, VPRV and VFNL are obtained at the shorter time interval α (at which a value "j" is incremented). Thus, successive final vehicle speed values VFNL are obtained on the basis of the updated provisional vehicle speed values VPRV and the same compensating coefficient K during each time period β.

Described more particularly, a cumulative error ERR is calculated at the time interval β. The cumulative error ERR is a sum of differences VSO(i,j)—VFNL(i−1,jmax) obtained in each time period β. The value VSO(i,j) is a value obtained at the time interval α, while the value VFNL(i−1,jmax) is the final vehicle speed value VFNL which was obtained last at the end of the preceding time period β, as the n-th value VFNL, where n=jmax (number of cycles implemented to obtain VFNL in each time period β). The cumulative error ERR is stored in the memory area 54-9 of the RAM 54. Then, an average of the cumulative error ERR is obtained as ERR/jmax, and the adjusting value ΔK(i+1) is calculated by dividing the average error ERR by an average of the estimated vehicle speed values VSO obtained in the time period β.

In the present embodiment, the steady running state of the vehicle is detected as being established if the following three conditions are satisfied:
1) The brake pedal is not depressed.
2) The vehicle is not accelerated or decelerated at a rate exceeding an upper limit.
3) The estimated vehicle speed VSO(i) lies within a predetermined range.

The non-operated state of the brake pedal is detected by an output signal of a brake switch which is turned on when the brake pedal is depressed. The acceleration or deceleration value of the vehicle is obtained as a difference between the successive two values of the estimated vehicle speed VSO. The acceleration or deceleration value is not excessive if the absolute value of the above difference is smaller than a predetermined threshold. The predetermined range of the estimated vehicle speed VSO(i) is defined by a lower limit A (e.g., 40 km/h) and an upper limit B (e.g., 70 km/h).

In the steady running state of the vehicle, the adjusting value ΔK(i) is updated or the next adjusting value ΔK(i+1) is determined to determine the next compensating coefficient K(i+1), as described above. In the transient running state (when any one of the above three conditions is not satisfied), the next adjusting value ΔK(i+1) is set to zero, that is, the present compensating coefficient K(i) is used as the next compensating coefficient K(i+1). The updated compensating value K(i) and the updated adjusting value ΔK(i) are stored in the memory areas 54-10 and 54-11 of the RAM 54, respectively.

In the present embodiment, the last value of the compensating coefficient K used in a steady running period is used as the initial value of the compensating coefficient K in the next steady running period which follows a transient running period between the two steady running periods. Thus, the compensating coefficient K is not reset to "1" at the beginning of each steady running period of the vehicle.

The above explanation refers to the manner of determining the compensating coefficient K used to determine the final vehicle speed VFNL when the level of the output signal of the receiver 12 is higher than the threshold value. When the output level of the receiver 12, that is, the peak voltage Vp stored in the memory area 54-4 of the RAM 54 is lower than the predetermined threshold Vpo, the normal control adapted to update the compensating coefficient K as described above is inhibited until the peak voltage Vp rise to the threshold Vpo. During this period, a special control is effected to fix the compensating coefficient K at the last value used in the preceding steady running period, and the final vehicle speed values VFNL(i) are determined on the basis of the provisional vehicle speed values VPRV(i) and the constant compensating coefficient K, at the time interval α.

Referring to the flow chart of FIG. 5, the final vehicle-speed calculating routine will be described in detail.

When the computer 50 is turned on, the compensating coefficient K stored in the memory area 54-10 is reset to the initial value "1", and the cumulative error ERR(i) and last final vehicle speed VFNL(i−1) stored in the respective memory areas 54-9 and 54-8 are set to the initial value "0". Then the routine of FIG. 5 is started and executed at the cycle time α (ms).

Initially, step S31 is implemented to read out the compensating coefficient K (reset to "1") from the memory area 54-10, as the presently effective compensating coefficient K(i). Further, the provisional vehicle speed VPRV is read out from the memory area 54-6, as the presently effective provisional vehicle speed VPRV(i,j), e.g., VPRV(1,1) in the first cycle of execution of the routine. Then, the final vehicle speed VFNL(i,j), e.g., VFNL(1,1) in the first cycle is calculated by multiplying the provisional vehicle speed VPRV(i,j) by the compensating coefficient K(i). The calculated final vehicle speed VFNL(i,j) is stored in the memory area 54-7 as the present final vehicle speed VFNL(i). It will be understood that the compensating coefficient K(i) represents a relationship between the provisional speed VPRV and the final speed VFNL (detected vehicle speed).

The control flow then goes to step S32 to determine whether the peak voltage Vp stored in the memory area 54-4 is higher than the predetermined threshold Vpo. If so, an affirmative decision (YES) is obtained in step S32, and the control flow goes to step S33.

In step S33, the estimated vehicle speed VSO is read out from the memory area 54-5, as the present estimated vehicle speed VSO(i,j), e.g., VSO(1,1). Further, the last final vehicle speed VFNL(i−1) which has been reset to "0" is read out from the memory area 54-8, as VFNL(i−1,jmax)=VFNL(0, jmax), and the cumulative error ERR which has also been reset to "0" is read out from the memory area 54-9. Then, the difference VSO(i,j)—VFNL(i−1,jmax) is calculated, and the read-out cumulative error ERR is added to the calculated difference to thereby update the cumulative error ERR, that is, to obtain the currently effective cumulative error ERR. The updated ERR is stored in the memory area 54-9.

Step S33 is followed by step S34 to determine whether the count CC of a counter which is incremented each time the routine of FIG. 5 is executed at the cycle time α has become equal to a predetermined value CCo which corresponds to the time interval β (ms) as indicated in FIG. 7. In the first cycle of execution of the routine, a negative decision (NO) is obtained in step S34, and the control flow returns to step S31, that is, one cycle of execution of the routine is completed.

When the time period β has passed as a result of repeated implementation of steps S31–S34, an affirmative decision (YES) is obtained in step S34, and the control flow goes to step S35 to read out the cumulative error ERR from the RAM 54, and calculate an average by dividing the error ERR by jmax. Further, the estimated vehicle speed values VSO stored in the memory area 54-5 are read out, and an average of these values VSO is calculated by dividing the sum of the values VSO by jmax. Then, the adjusting value ΔK(i+1)=ΔK(2) to be used in step S31 in the next cycle of execution of the routine is obtained as a quotient calculated by dividing the average cumulative error ERR by the calculated average of the estimated vehicle speed values VSO. Further, the cumulative error ERR stored in the RAM 54 and the count CC are reset to "0" for the next implementation of steps S33 and S34.

Step S35 is adapted to reset the adjusting value ΔK(i+1) to "0" immediately after it is found that the average of the estimated vehicle speed values VSO is substantially zero.

Step S35 is followed by steps S36–A39 to determine whether the vehicle is running in the steady state or in the transient state. More specifically step S36 is implemented to determine whether the brake switch is on, and step S37 is implemented to determine whether the absolute value of the vehicle acceleration or deceleration value (rate of change in the value VSO) is equal to or larger than a predetermined threshold value Go. Step S38 is then implemented to determine whether the average of the estimated vehicle speed values VSO is equal to or lower than the predetermined lower limit A, and step S39 is implemented to determine whether the above average is equal to or higher than the predetermined upper limit B. If a negative decision (NO) is obtained in all of the above four steps S36–S39, this means that the vehicle is running in the steady state. In this case, the control flow goes to step S40 in which the adjusting value ΔK(i+1) is added to the presently effective compensating coefficient K(i) to obtain the next compensating coefficient K(i+1). The obtained coefficient K(i+1) is stored in the memory area 54-10 of the RAM 54.

If an affirmative decision (YES) is obtained in any one of the above four steps S36–S39, this indicates that the vehicle is running in the transient state. In this case, step S41 is implemented in which the currently effective compensating coefficient K(i) is determined as the next compensating coefficient K(i+1). Thus, the compensating coefficient K stored in the memory area 54-10 remains unchanged.

Steps S40 and S41 are followed by step S43 to increment the value "i" for execution of the routine in the next period β.

It will be understood therefore that the compensating coefficient K is updated each time the affirmative decision (YES) is obtained in step S34 while the vehicle is running in the steady state, with the provisional speed VPRV (estimated speed VSO) slowly changing or held substantially constant.

Figure 8:
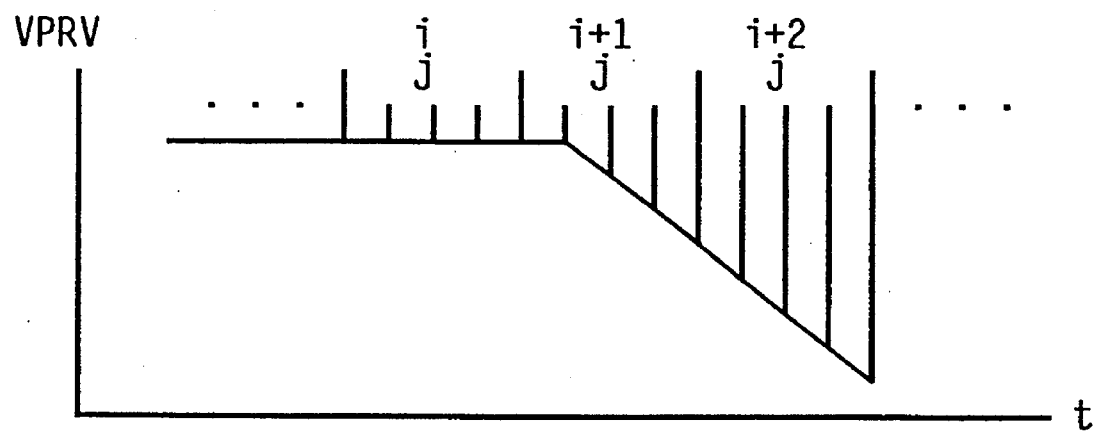
FIGS. 8 and 9 are graphs indicating the provisional vehicle speed varying with time.

The graph of FIG. 8 shows an example of a change in the provisional vehicle speed VPRV, wherein the vehicle first runs in a steady state at a substantially constant speed during a first period indicated at "i", and then runs in a transient state with a rapid drop of the speed during the following second and third periods indicated at "i+1" and "i+2". These periods correspond to the time interval β. In the first or "i"-th period which starts with the affirmative decision (YES) in step S34, step S40 is implemented to update the compensating coefficient K. In the second "i+1"-th period which also starts with the affirmative decision in step S34, step S41 rather than step S40 is implemented, whereby the compensating coefficient K(i+1) used in the second period is used as K(i+2) in the third or "i+2"-th period. It is noted that step S41 is implemented in the second or "i+1"-th period even if the provisional vehicle speed VPRV starts to drop in an early portion of the "i+1"-th period as in the example of FIG. 8, because the step S38 to detect the excessive drop of the vehicle speed for example is implemented in a relatively terminal part of the steady state checking portion (S36–S39) of the routine.

Figure 9:
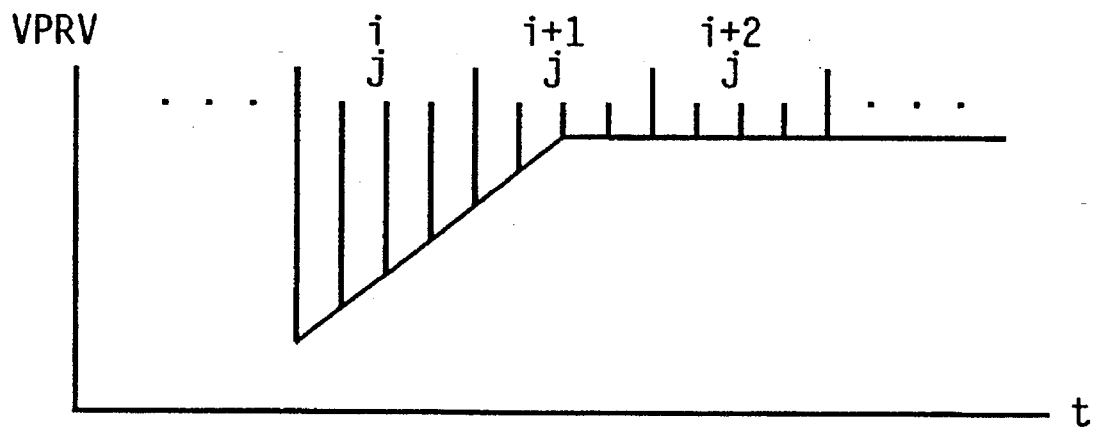

The graph of FIG. 9 shows another example of the vehicle running condition in which the vehicle is in the transient running state in the first or "i"-th period, and is returned to the steady running state in the following "i+1"-th and "i+2"-th periods. In this case, the updating of the compensating coefficient K is inhibited with step S41 implemented during the "i"-th and "i+1"-th periods, but the coefficient K is updated in step S40 in the "i+2"-th period. Since the vehicle is in the transient state in an early part of the "i+1"-th period, all the estimated vehicle speed values VSO used in step S35 to calculate the adjusting value ΔK(i+2) used for the "I+2"-th period are not the values VSO obtained in the steady running state. However, an error due to this partial dependence on the values VSO in the transient running state is not considerable and is negligible in practice.

It will be understood from the above description of the present embodiment that the compensating coefficient K used to correct the detecting error of the vehicle ground speed (VFNL) is obtained not as a difference between the estimated vehicle speed and the provisional vehicle speed as in the conventional apparatus, but obtained as a ratio with respect to the provisional vehicle speed VPRV. Therefore, the final vehicle speed VFNL is obtained by multiplying the provisional speed VPRV by the obtained ratio, i.e., compensating coefficient K. This arrangement provides an improvement in the detecting accuracy of the vehicle speed detecting apparatus, without the final speed VFNL in the transient running state of the vehicle being influenced by fluctuating factors such as a variation in the angle of the transmitter 10 relative to the ground or road surface, even if there exists a considerable difference of the actual vehicle speed in the transient state with respect to that in the preceding steady state.

Figure 10:
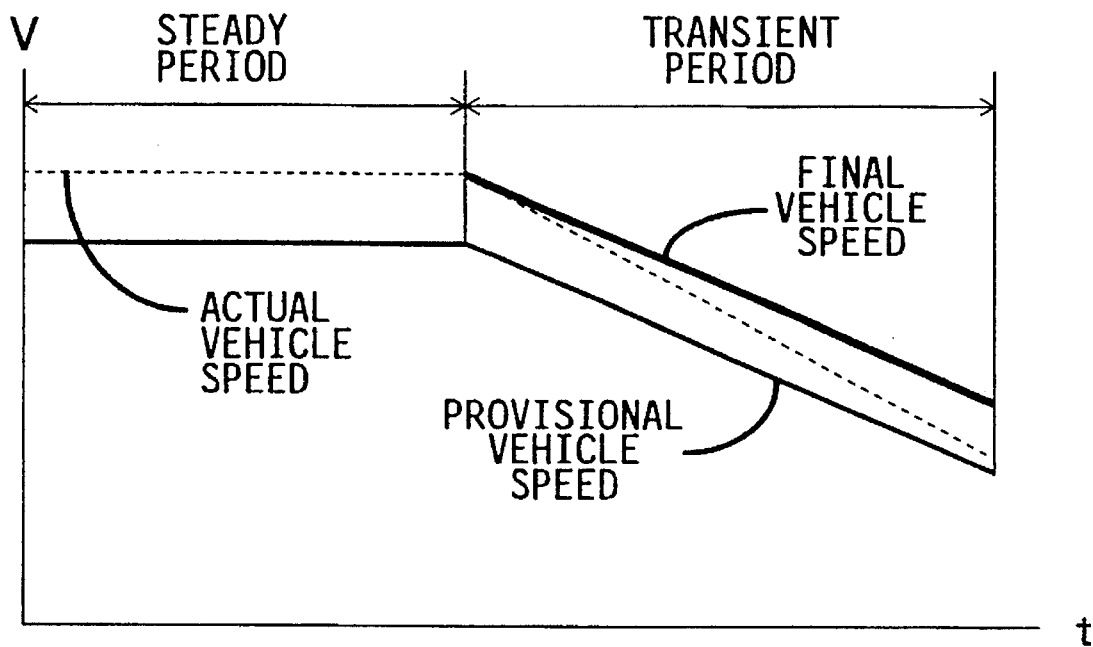
FIG. 10 is a graph showing a change in the calculated final vehicle speed with respect to the actual vehicle speed, according to one form of a Doppler-effect vehicle-speed detecting apparatus over which the first embodiment is advantageous.
Figure 11:
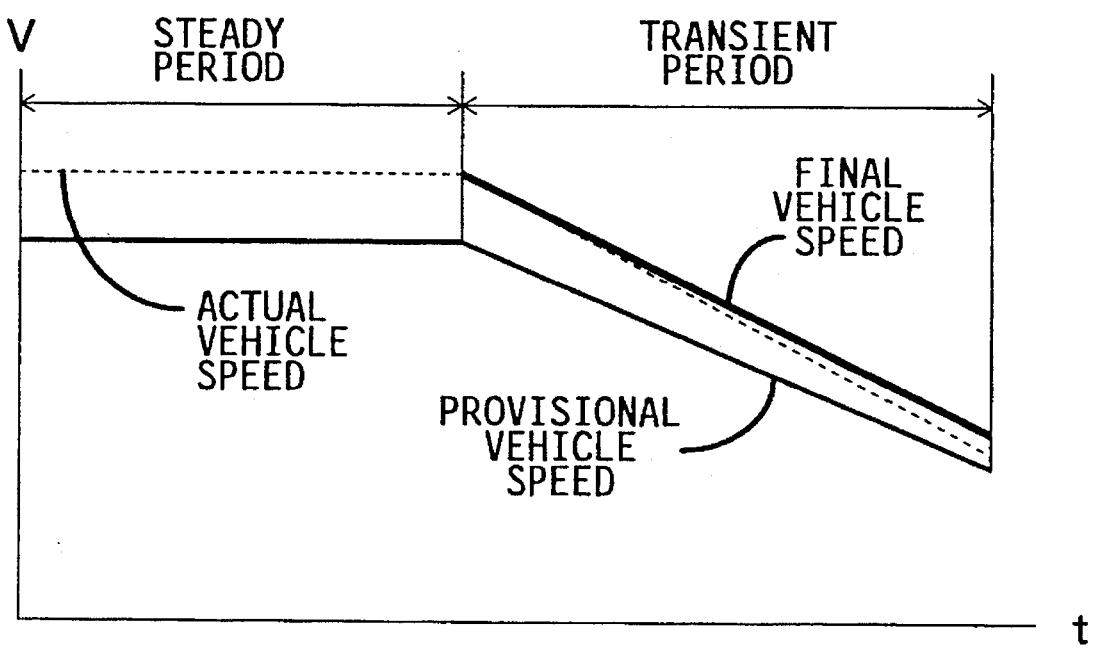
FIG. 11 is a graph corresponding to that of FIG. 10, showing a change in the final vehicle speed calculated according to the first embodiment of this invention.

The graph of FIG. 10 shows changes in the actual vehicle speed, and the final vehicle speed VFNL calculated on the basis of the difference between the estimated and provisional vehicle speeds according to an arrangement in which the final vehicle speed is determined by adding to the provisional vehicle speed a difference between the estimated and provisional speeds. In this arrangement which also falls within the scope of the present invention, the final vehicle speed VFNL gradually deviates from the actual vehicle speed when the vehicle is running in the transient state, as indicated in FIG. 10. On the other hand, the final vehicle speed VFNL calculated on the basis of the compensating coefficient K according to the present embodiment is substantially coincident with the actual vehicle speed even in the transient running state, as indicated in the graph of FIG. 11. Thus, the present Doppler-effect vehicle speed detecting apparatus assures consistently high detecting accuracy, as compared with the apparatus of FIG. 10.

While the operation of the present embodiment when the peak voltage Vp (output level of the receiver 12) is higher than the threshold Vpo has been described above, the final vehicle-speed calculating routine of FIG. 5 is adapted to implement step S42 if the peak voltage Vp is temporarily lowered to the threshold level Vpo or below that level, for some reason or other, for example, when the vehicle passes a water puddle or plash on the road surface. In this case, the cumulative error ERR and the count CC stored in the memory areas 54-9 and 54-14 of the RAM 54 are reset to "0", in step S42 implemented as a result of the negative decision (NO) in step S32. Step S42 is repeatedly implemented until the peak voltage Vp rises above the threshold lower limit Vpo.

Figure 12:
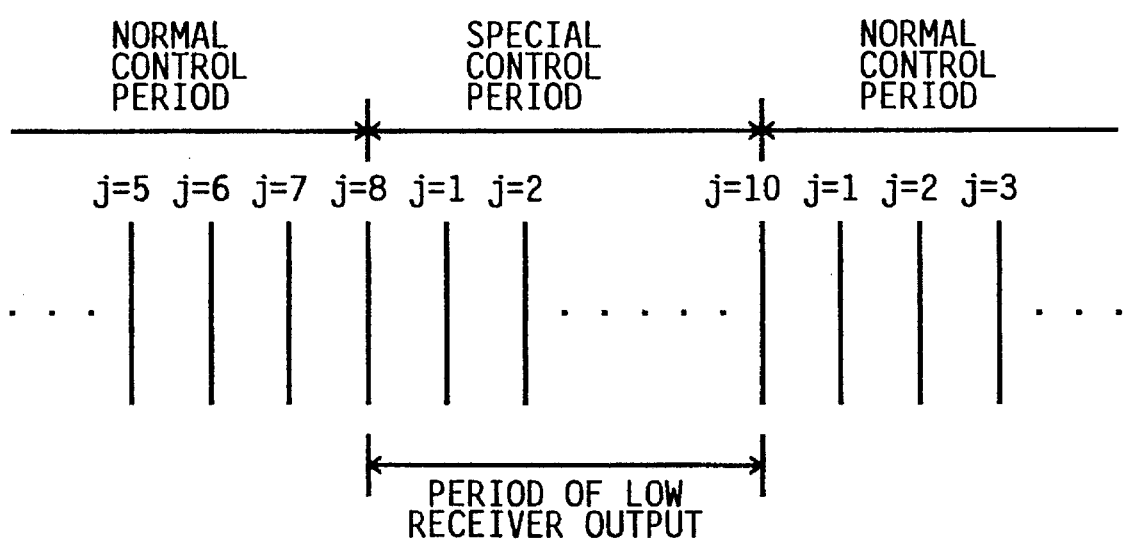
FIG. 12 is a view indicating normal and special controls effected in the first embodiment, while the output level of the receiver of the apparatus is higher and lower than a threshold.

Thus, while the level of the output signal of the receiver 12 is lower than the predetermined value, the computer 50 effects a special control in which the updating of the compensating coefficient K is inhibited, with steps S33–S41 being skipped, and step S42 implemented to clear the memory areas 54-9 and 54-14. The special control is replaced by the normal control when the output level of the receiver 12 returns to the normal level, as indicated in FIG. 12. During the special control period, the compensating coefficient K stored in the memory area 54-10 of the RAM 54 is not updated, that is, the compensating coefficient (i–1) used in the preceding normal control period (with the peak voltage Vp higher than the threshold Vpo) is used as the effective coefficient K(i). Thus, the constant coefficient K(i) is used to compensate the provisional vehicle speed values VPRV(i) to obtain the final vehicle speed values VFNL(i) in the special control period.

Accordingly, the compensating coefficient K used to obtain the final vehicle speed VFNL in the steady running state is not adversely affected by the temporary drop of the output level of the receiver 12, and the vehicle speed VFNL can be accurately determined even in the transient running state in which the coefficient K obtained in the steady state is utilized.

It will be understood that the portion of the computer 50 assigned to execute the estimated vehicle-speed calculating routine stored in the memory area 52-5 of the ROM 52 cooperates with the wheel speed sensor 60 to provide means for calculating the estimated vehicle speed VSO. However, the present embodiment may utilize the estimated vehicle speed VSO obtained by other devices such as an anti-lock brake control device in which the estimated vehicle speed VSO is used to regulate the braking force applied to the vehicle so as to maintain the wheel slip within an optimum range.

It will also be understood that the elements 20, 22, 30, 32, 34, 40 and 42 cooperate to constitute means for generating a Doppler-frequency signal indicative of the Doppler frequency or Doppler shift fd.

There will be described a second embodiment of this invention, which is identical with the first embodiment, except for the period calculating routine and the provisional vehicle-speed calculating routine which are stored in the ROM 52. The RAM 54 used in the second embodiment has memory areas for storing necessary data other than those described with respect to the first embodiment. For instance, the RAM 54 has memory areas for storing data indicative of provisional period values TPRV, data indicative of a final period TFNL, and data indicative of an upper limit Tαmax and a lower limit Tαmin. In the interest of brevity and simplification, only the period calculating routine and the provisional vehicle-speed calculating routine used in the present second embodiment will be explained.

The period calculating routine is first briefly explained. Initially, the provisional period TPRV of the pulses of the Doppler-frequency signal received from the band-pass filter 42 is calculated by subtracting the time t(i−1) of the last pulse from the time t(i) of the presently received pulse. Then, a determination is made as to whether the final vehicle speed VFNL obtained last is higher than a predetermined value D. If so, the final period TFNL is determined on the basis of the provisional period TPRV in relation to a variable reference range and a fixed reference range thereof, as described below in detail. If the last final vehicle speed VFNL is equal to or lower than the predetermined value D, the provisional period TPRV is determined as the final period TFNL.

The variable reference range for the provisional period TPRV is defined by the upper and lower limits Tαmax and Tαmin. The upper limit Tαmax is equal to a sum of an average TMEAN (hereinafter referred to as average period TMEAN) of two or more successive provisional period values TPRV, and a predetermined upper allowance ΔTUP. The lower limit Tαmin is equal to a difference TMEAN— ΔTDOWN, where ΔTDOWN is a predetermined lower allowance. Accordingly, the upper and lower limits Tαmax and Tαmin of the variable reference range vary or shift simultaneously in the same direction, as indicated at (i) through (v) in the graph of FIG. 13, with a change in the average period TMEAN, that is, depending upon the actual vehicle speed (final vehicle speed VFNL) before the final period TFNL is determined. However, the width of the reference range is constant irrespective of the change in the actual vehicle speed. The predetermined allowances ΔTUP and ΔTDOWN are determined based on the maximum and minimum acceleration and deceleration values of the vehicle which are determined by the specifications and characteristics of the vehicle. These values ΔTUP and ΔTDOWN are stored in the ROM 52.

The fixed reference range is defined by an upper limit Tβmax corresponding to the maximum speed (e.g., 200 km/h) of the vehicle and a lower limit Tβmin corresponding to the vehicle speed of 0 km/h. This fixed range is therefore determined by the specifications of the vehicle. It will be understood that the variable range is considerably narrower than the fixed range.

Figure 13:
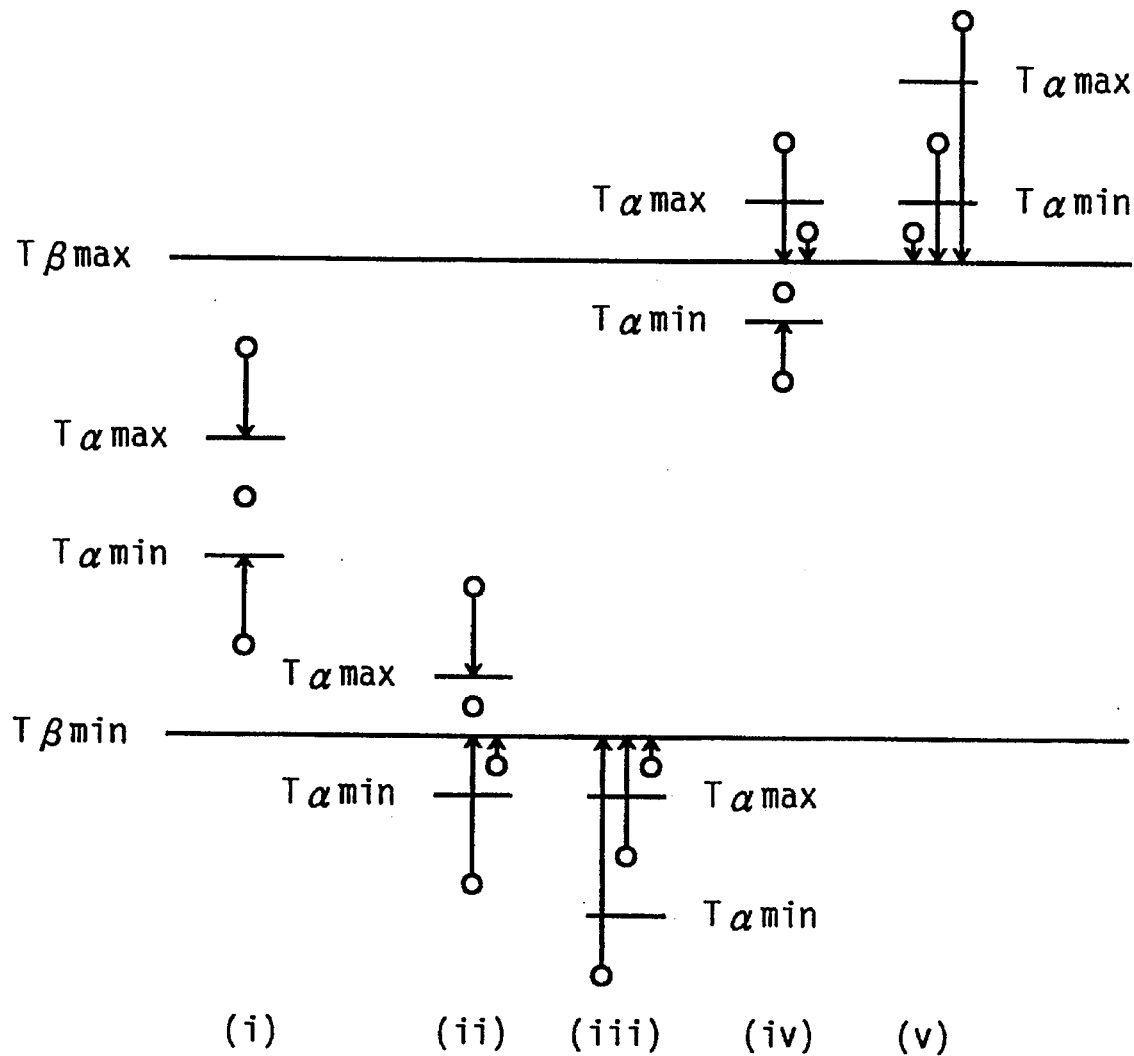
FIG. 13 is a view explaining a concept of a second embodiment of this invention in which provisional period of pulses obtained from the receiver of the apparatus is checked in relation to variable and fixed reference ranges, in determining the final period according to a period calculating routine of FIG. 14.

As shown in the graph of FIG. 13, there are five different cases (i) through (v) in terms of the relationship between the variable range Tαmax–Tαmin relative to the fixed range Tβmax–Tβmin. In the first case (i), the entire variable reference range lies within the fixed reference range. In the second case (ii), the lower limit Tαmin of the variable range is smaller than the lower limit Tβmin of the fixed range. In the third case, the entire variable range is outside the fixed range, with the upper and lower limits Tαmax and Tαmin being smaller than the lower limit Tβmin. In the fourth case (iv), the upper limit Tαmax of the variable range is larger than the upper limit Tβmax of the fixed range. In the fifth case, the entire variable range is outside the fixed range, with the upper and lower limits Tαmax and Tαmin being larger than the upper limit Tβmax.

In the present embodiment, the final period TFNL of the pulses of the Doppler-frequency signal received from the band-pass filter 42 (which corresponds to the final period of the output signal of the receiver 12) is determined on the basis of the provisional period TPRV in relation to the variable range, depending upon which one of the five cases (i) through (v) is met.

In the first case (i), the final period TFNL is determined as follows:
(a) If the provisional period TPRV lies within the variable reference range, the provisional period TPRV is determined as the final period TFNL.
(b) If the provisional period TPRV is larger than the upper limit Tαmax of the variable reference range, the upper limit Tαmax is determined as the final period TFNL.
(c) If the provisional period TPRV is smaller than the lower limit Tαmin of the variable reference range, the lower limit Tαmin is determined as the final period TFNL.

In the second case (ii), the final period TPRV is determined as follows:
(a) If the provisional period TPRV is larger than the lower limit Tαmin of the fixed reference range and is smaller than the upper limit Tαmax of the variable reference range, the provisional period TPRV is determined as the final period TFNL.
(b) If the provisional period TPRV is larger than the upper limit Tαmax of the variable reference range, the upper limit Tαmax is determined as the final period TFNL.
(c) If the provisional period TPRV is smaller than the lower limit Tβmin of the fixed reference range, the lower limit Tβmin is determined as the final period TFNL.

In the third case (iii), the lower limit Tβmin of the fixed reference range is determined as the final period TFNL, irrespective of the value of the provisional period TPRV.

In the fourth case (iv), the final period TFNL is determined as follows:
(a) If the provisional period TPRV is smaller than the upper limit Tβmax of the fixed reference range and is larger than the lower limit Tαmin of the variable reference range, the provisional period TPRV is determined as the final period TFNL.
(b) If the provisional period TPRV is smaller than the lower limit Tαmin of the variable reference range, the lower limit Tαmin is determined as the final period TFNL.
(c) If the provisional period TPRV is larger than the upper limit Tβmax of the fixed reference range, the upper limit Tβmax is determined as the final period TFNL.

In the fifth case (v), the upper limit Tβmax is determined as the final period TFNL, irrespective of the value of the provisional period TPRV.

It will be understood that the determination of the final period TFNL using the variable and fixed reference ranges in the manner described above results in adjusting the final period TFNL which is used in the provisional vehicle-speed calculating routine to calculate the provisional vehicle speed VPRV, which is used in the final vehicle-speed calculating routine of FIG. 5 to calculate the final vehicle speed VFNL.

Referring next to the flow chart of FIG. 14, the period calculating routine will be described.

Figure 14:
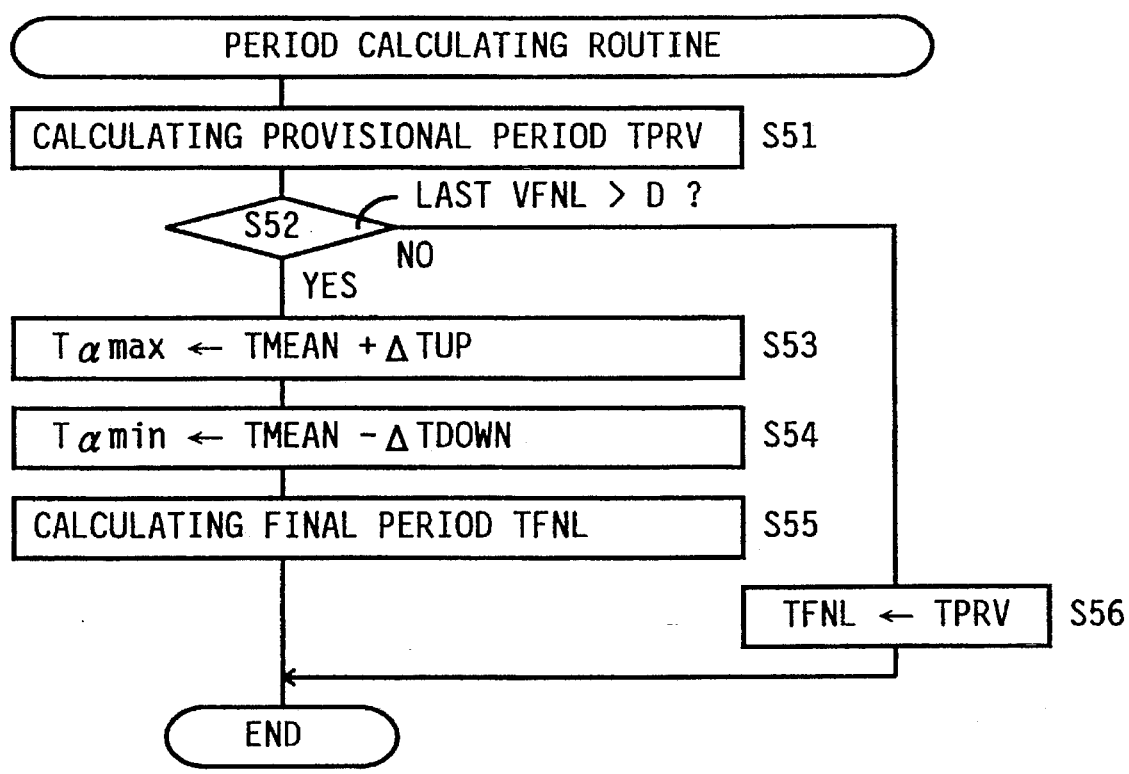
FIG. 14 is a flow chart illustrating the period calculating routine executed in the second embodiment.

When the computer 50 is turned on, the routine of FIG. 14 is executed at a predetermined cycle time.

Initially, step S51 is implemented to read out the times t(i) and t(i−1) from the memory areas 54-1 and 54-2 of the RAM 54, and calculate the provisional period TPRV by subtracting the time t(i−1) from the time t(i). Then, the control flow goes to step S52 to read out the last final vehicle speed VFNL from the memory area 54-8 of the RAM 54, and determine whether the speed VFNL is higher than the predetermined lower limit D (e.g., 20 km/h) or not. If so, an affirmative decision (YES) is obtained in step S52, and step S53 is implemented to read out from the RAM 54 a predetermined number of values of the provisional period TPRV which have been stored in the RAM 54. These values TPRV do not include the one obtained in step S51 in the present cycle of execution of the routine. Then, the average period TMEAN is calculated from the read-out values TPRV, and the predetermined upper allowance ΔTUP is added to the calculated average period TMEAN, to calculate the upper limit Tαmax of the variable reference range. The calculated upper limit Tαmax is stored in the RAM 54. Step S53 is followed by step S54 to subtract the predetermined lower allowance ΔTDOWN from the average period TMEAN, to calculate the lower limit Tαmin of the variable reference range. This lower limit Tαmin is also stored in the RAM 54. Thus, the variable reference range is determined depending upon the vehicle speed during the predetermined preceding period of time.

The control flow then goes to step S55 to determine the final period TFNL on the basis of the present provisional period TPRV (obtained in step S51 in the present cycle) in relation to the variable and fixed reference ranges, in the manner as described above in detail. The determined final period TFNL is stored in the RAM 54. Then, the control flow returns to step S51. Thus, one cycle of execution of the routine is completed.

If the final vehicle speed TFNL is equal to or lower than the predetermined lower limit D, a negative decision (NO) is obtained in step S52, and step S56 is implemented to determine the presently calculated provisional period TPRV as the final period TFNL. The control flow then returns to step S51.

It will be understood from the above description of the second embodiment that steps S53–S55 to determine the final period TFNL depending upon the variable and fixed reference ranges are skipped when the final vehicle speed VFNL is equal to or lower than the predetermined lower limit D (e.g., 20 km/h). This arrangement does not suffer from a problem that the calculated final vehicle speed VFNL tends to be higher than the actual vehicle speed when the vehicle speed is relatively low (e.g., lower than 20 km/h). In other words, the present arrangement prevents erroneous shortening of the calculated or determined final period TFNL of the output signal of the receiver 12 when the actual vehicle speed is relatively low and the actual period of the Doppler frequency is accordingly long.

In the above embodiment, the variable reference range is used to determine the final period TFNL when the final vehicle speed VFNL is higher than the lower limit D, and the provisional period TPRV is necessarily determined as the final period TFNL when the speed VFNL is not higher than the lower limit D. This means that the reference range used when the speed VFNL is not higher than the lower limit D is considered to have an infinitely large width to cover any value of the provisional period TPRV.

As is apparent from the above description, the present second embodiment is arranged so that the determined final period TFNL increases with a decrease in the actual vehicle speed, whereby the calculated final vehicle speed VFNL accurately represents the actual vehicle speed. In this respect, it is required that the determined final vehicle speed VFNL should be zero when the actual vehicle speed is zero. In other words, some means is necessary to predict or estimate whether the actual vehicle speed is zero or not, and zero the final vehicle speed VFNL if it is predicted that the actual vehicle speed is zero.

Figure 15:
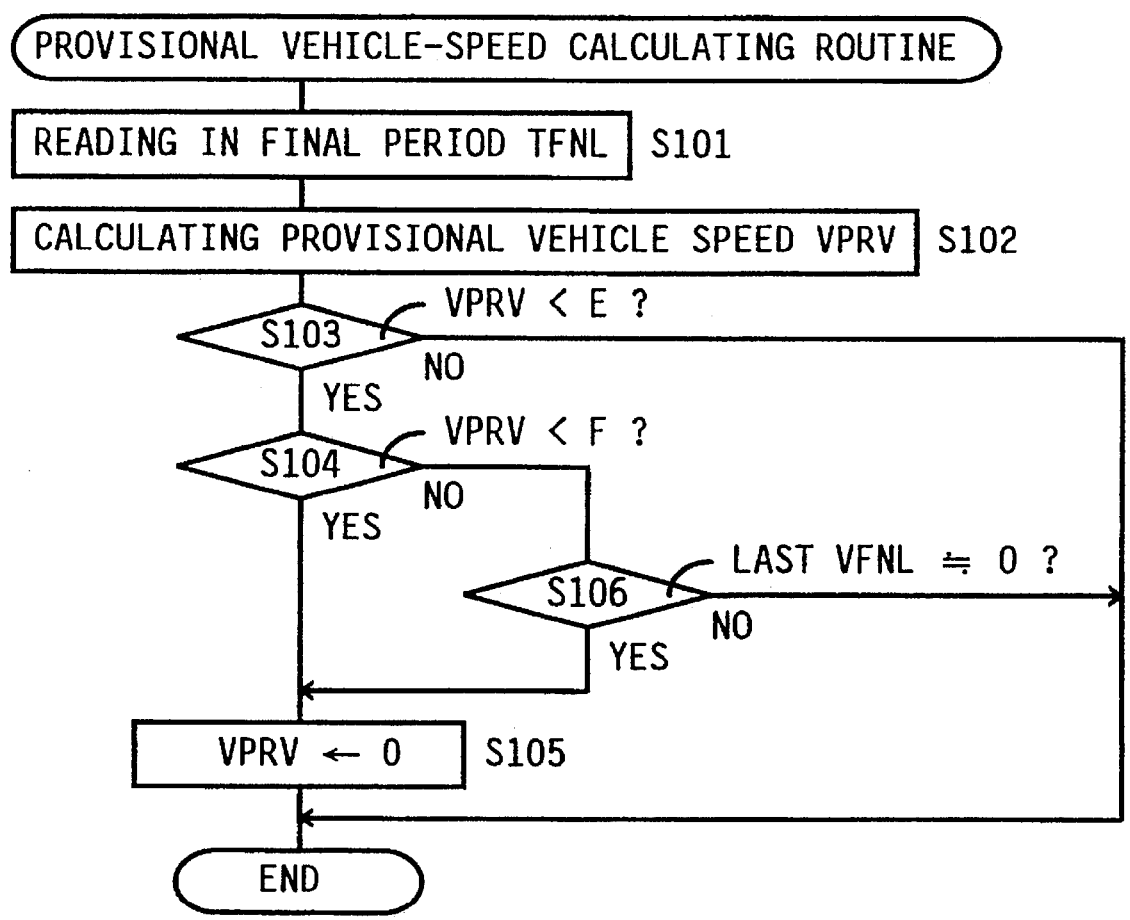
FIG. 15 is a flow chart illustrating one form of a provisional vehicle-speed calculating routine executed in the second embodiment.
Figure 16:
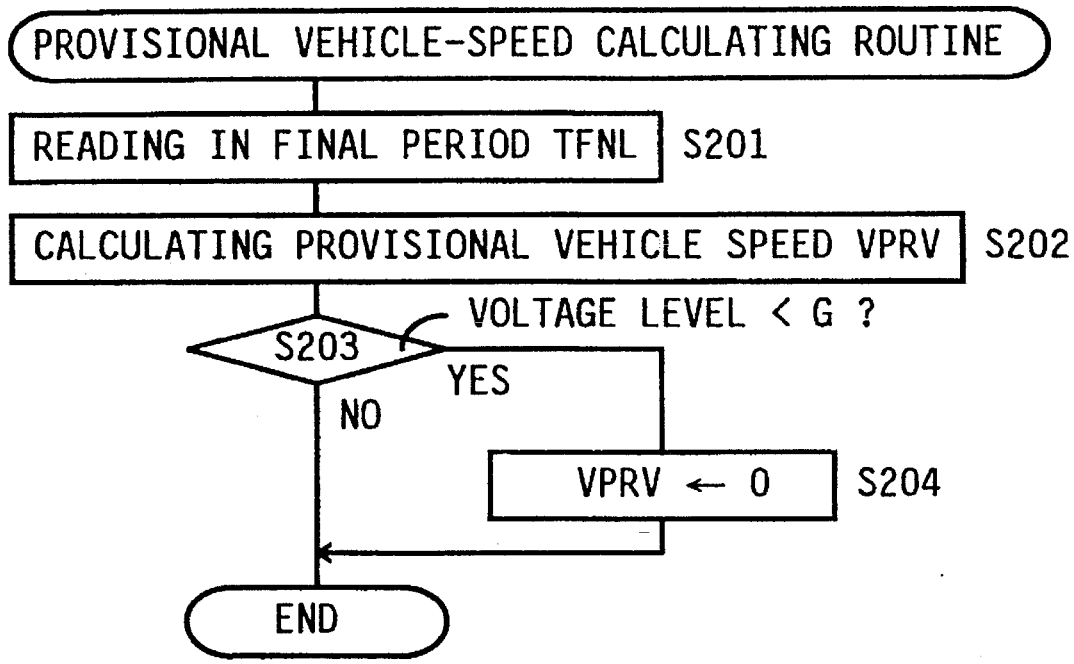
FIG. 16 is a flow chart illustrating another form of the provisional vehicle-speed calculating routine according to the second embodiment.
Figure 17:
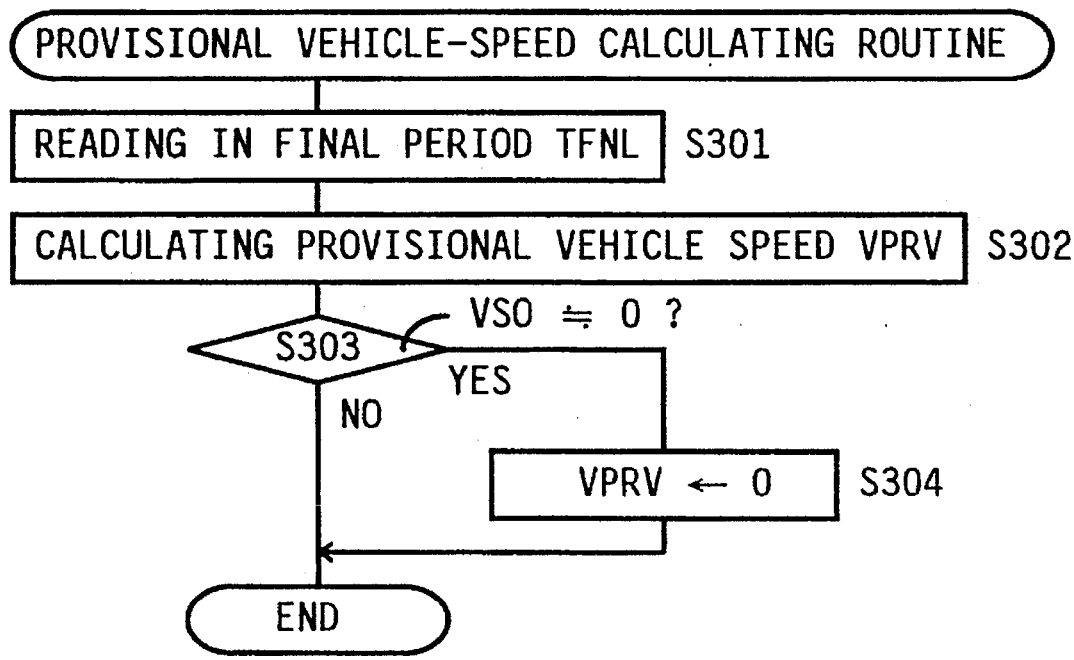
FIG. 17 is a flow chart illustrating a further form of the provisional vehicle-speed according to the second embodiment.

To meet the above requirement, the provisional vehicle-speed calculating routine used in the second embodiment is adapted to effect a special processing as illustrated in the flow charts of FIGS. 15–17, which show three different forms of the provisional vehicle-speed calculating routines available for the second embodiment.

The first form of the routine is shown in FIG. 15, wherein the presently obtained provisional vehicle speed VPRV is zeroed when the present speed value VPRV is found zero or almost zero, or when the present speed value VPRV is sufficiently close to zero and when the last speed value VPRV is zero or sufficiently close to zero. More specifically, step S101 is initially implemented to read out the present final period TFNL from the RAM 54. Then, step S102 is implemented to calculate the provisional vehicle speed VPRV on the basis of the final period TFNL. Step S102 is followed by step s103 to determine whether the provisional vehicle speed VPRV is lower than a predetermined first threshold value E. If not, a negative decision(NO) is obtained in step S103, and the control returns to step S101. If the provisional vehicle speed VPRV is lower than the first threshold value E, an affirmative decision (YES) is obtained in step S103, and the control flow goes to step S104 to determine whether the provisional vehicle speed VPRV is lower than a predetermined second threshold value F (lower than the value E). If so, step S104 is followed by step S105 in which the provisional vehicle speed VPRV once determined in step S101 is zeroed. If the value VPRV is not lower than the second threshold value F, step S104 is followed by step S106 to determine whether the last final vehicle speed VFNL stored in the RAM 54 is zero or sufficient close to zero. If an affirmative decision (YES) is obtained in step S106, step S105 is implemented to zero the value VPRV. If a negative decision (NO) is obtained in step S106, step S105 is not implemented and the control returns to step S101.

The two threshold values E and F are used to prevent chattering in detecting the vehicle speed. For instance, the values E and F are 8 km/h and 5 km/h. The use of these two threshold values E and F causes the provisional vehicle speed VPRV to be zeroed until the speed VPRV rises up to the upper threshold value of 8 km/h while the actual vehicle speed is increasing, and does not cause the speed VPRV to be zeroed until the speed VPRV falls down to the lower threshold value of 5 km/h while the actual vehicle speed is decreasing. Thus, the switching of the zeroing and non-zeroing of the provisional vehicle speed VPRV when the speed VPRV is between the two threshold values E and F has a hysteresis in terms of the direction of change in the actual vehicle speed.

The second form of the provisional vehicle-speed calculating routine is illustrated in the flow chart of FIG. 16, wherein the provisional vehicle speed VPRV is calculated from the presently obtained final period TFNL, and the Doppler-frequency signal received from the band-pass filter 42 is converted by a frequency-voltage converter into a voltage signal whose level increases with an increase in the Doppler frequency fd represented by the Doppler-frequency signal. If the level of the voltage signal is lower than a threshold value G, that is, if the Doppler frequency fd is sufficiently close to zero, the provisional vehicle speed VPRV once calculated is zeroed. More specifically, step S201 is initially implemented to read out the present final period TFNL from the RAM 54. Step S202 is then implemented to calculate the present provisional vehicle speed VPRV from the final period TFNL. Step S202 is followed by step S203 to determine whether the level of the voltage signal obtained by conversion from the Doppler-frequency signal is lower than the threshold value G. If a negative decision (NO) is obtained in step S203, the control flow returns to step S201. If an affirmative decision (YES) is obtained in step S203, step S204 is implemented to zero the provisional vehicle speed VPRV once calculated in step S202.

The third form of the provisional vehicle-speed calculating routine is illustrated in the flow chart of FIG. 17, wherein the provisional vehicle speed VPRV is calculated from the present final period TFNL, and the calculated speed VPRV is zeroed if the present estimated vehicle speed VSO stored in the RAM 54 is zero or sufficiently close zero. More particularly, step S302 is initially implemented to read out the final period TFNL from the RAM 54. Step S302 is then implemented to calculate the provisional vehicle speed VPRV from the final period TFNL. Step S302 is followed by step S303 to determine whether the presently estimated vehicle speed VSO (stored in the memory area 54-4 of the RAM 54) is zero or sufficiently close to zero. If not, the control flow returns to step S301. If the speed VSO is zero or sufficiently close to zero, step S304 is implemented to zero the once calculated speed VPRV.

There will next be described a third embodiment of the present invention.

The period calculating-routine of FIG. 14 used in the second embodiment is adapted so that the determination of the final period TFNL using the reference ranges is inhibited when the last final vehicle speed VFNL (actual vehicle speed) is lower than a predetermined lower limit. In the third embodiment, however, two variable reference ranges are selectively used depending upon the last final vehicle speed VFNL. The third embodiment is identical with the second embodiment, except for the period calculating routine.

Figure 18:
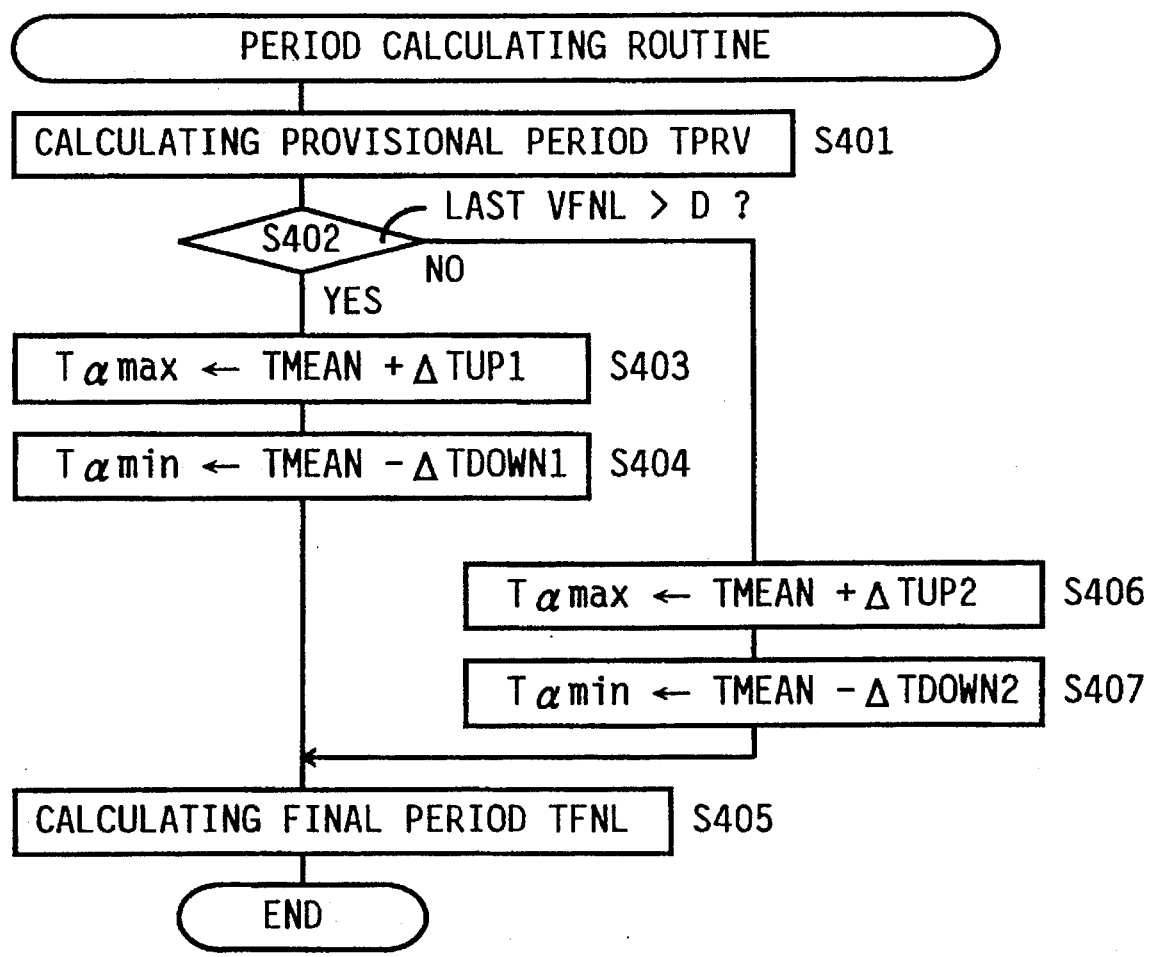
FIG. 18 is a flow chart illustrating a period calculating routine executed according to a third embodiment of the present invention.

The period calculating routine used in the third embodiment is illustrated in the flow chart of FIG. 18. Initially, step S401 is implemented to calculate the provisional period TPRV, as in step S51 of the second embodiment. Step S402 is then implemented to determine whether the last vehicle speed VFNL is higher than the predetermined lower limit D, as in step S52. If so, the control flow goes to step S403 to calculate the upper limit Tαmax of a first variable reference range by adding a predetermined first upper allowance ΔTUP1 (stored in the ROM 52) to the average period TMEAN. Then, step S404 is implemented to calculate the lower limit Tαmin of the first variable reference range by adding a predetermined first lower allowance ΔTDOWN1 (also stored in the ROM 52) to the average period TMEAN. Thus, the first variable reference range is defined by the calculated upper and lower limits Tαmax and Tαmin. Step S404 is followed by step S405 to determine the final period TFNL, in the same manner as in step S55 of FIG. 14.

If the last final vehicle speed VFNL is equal to or higher than the lower limit D, a negative decision (NO) is obtained in step S402, and the control flow goes to step S406 to calculate the upper limit Tαmax of a second variable reference range by adding a predetermined second upper allowance ΔTUP2 (also stored in the ROM 52) to the average period TMEAN. Then, step S407 is implemented to calculate the lower limit Tαmin of the second variable reference range by adding a predetermined first lower allowance ΔTDOWN2 (also stored in the ROM 52) to the average period TMEAN. Thus, the second variable reference range is defined by the calculated upper and lower limits Tαmax and Tαmin. Since the second upper and lower allowances ΔTUP2 and ΔTDOWN2 are larger than the respective first upper and lower allowances ΔTUP1 and ΔTDOWN1, the second variable range used when the last final vehicle speed VFNL is equal to the lower limit D or lower is wider than the first variable range. Step S407 is followed by step S405 described above.

While the present invention has been described in detail in its presently preferred embodiments, for illustrative purpose only, it is to be understood that the invention may be otherwise embodied.

For instance, although the illustrated embodiments are adapted such that the period of each pulse of the Doppler-frequency signal representative of the Doppler frequency fd is calculated and used to determine the final vehicle speed VFNL, it is possible that a total period or an average period of two or more successive pulses of the Doppler-frequency signal is obtained and used to determine the final vehicle speed VFNL.

In the illustrated embodiments, the compensating coefficient K is updated in the steady running state of the vehicle, by adding the calculated adjusting value ΔK to the present value of the coefficient K(i), as shown in the flow chart of FIG. 5. However, the compensating coefficient K may be obtained and updated in the steady running state, by dividing an estimated vehicle speed VSO by the provisional vehicle speed VPRV. In this case, the last one or an average of the compensating coefficient values K obtained in the steady running state may be used as the compensating coefficient K in the transient running state. Alternatively, an average of the estimated vehicle speed values VSO in the steady running state divided by an average of the provisional vehicle speed values VPRV in the steady running state may be used as the compensating coefficient K used in the transient running state.

In the illustrated embodiments, the final vehicle speed VFNL is calculated by multiplying the provisional speed VPRV by the compensating coefficient K in both the steady running state and the transient running state of the vehicle, in step S31 of the routine of FIG. 5. In the steady running state of the vehicle, however, the estimated vehicle speed VSO may be used as the final vehicle speed VFNL, since the estimated vehicle speed VSO accurately represents the actual vehicle speed, in the steady running state which is so defined.

While the illustrated embodiments are adapted such that the provisional vehicle speed VPRV is determined on the basis of the period T or final period TFNL, and the final vehicle speed is determined based on the provisional vehicle speed VPRV, the final vehicle speed VFNL may be determined directly based on the period T or final period TFNL.

It is to be understood that the present invention may be embodied with various other changes, modifications and improvements, which may occur to those skilled in the art, without departing from the spirit and scope of the invention defined in the accompanying claims.

What is claimed is:

1. A Doppler-effect speed detecting apparatus for detecting a ground speed of a motor vehicle, having (a) a transmitter for transmitting a wave toward a ground surface, (b) a receiver for receiving a portion of the transmitted wave which is reflected by the ground surface, and (c) a signal processor for determining said ground speed of the vehicle, according to a Doppler effect on the basis of a frequency of said transmitted wave and a frequency of the reflected wave, wherein the improvement comprises:

vehicle speed estimating means for obtaining an estimated vehicle speed on the basis of a rotating speed of a wheel of the vehicle;

said signal processor comprising relationship obtaining means for obtaining a relationship between said estimated vehicle speed and a provisional vehicle speed determined on the basis of said frequencies of said transmitted and reflected waves, said relationship comprising a compensating value; and said signal processor further comprising final-speed determining means for determining a final vehicle speed as said ground speed by multiplying said compensating value obtained by said relationship obtaining means by said provisional vehicle speed.

2. A Doppler-effect speed detecting apparatus according to claim 1, wherein said relationship obtaining means obtains said relationship, when the vehicle is in a steady running state in which said estimated vehicle speed accurately represents said ground speed of the vehicle.

3. A Doppler-effect speed detecting apparatus according to claim 2, wherein said final-speed determining means determines said final vehicle speed in said steady running state, on the basis of said relationship obtained in said steady running state.

4. A Doppler-effect speed detecting apparatus according to claim 2, wherein said final-speed determining means obtains said final vehicle speed in a transient running state of the vehicle in which said estimated vehicle speed does not accurately represent said ground speed, said final-speed determining means obtaining said final vehicle speed in said transient running state, on the basis of the relationship obtained in the steady running state which precedes said transient running state.

5. A Doppler-effect speed detecting apparatus according to claim 1, wherein said compensating value comprises a compensating coefficient when said vehicle is in a steady running state, and wherein said final-speed determining means, when said vehicle is in a transient running state, calculates said final vehicle speed by multiplying said provisional vehicle speed by said compensating coefficient.

6. A Doppler-effect speed detecting apparatus for detecting a ground speed of a motor vehicle, having (a) a transmitter for transmitting a wave toward a ground surface, (b) a receiver for receiving a portion of the transmitted wave which is reflected by the ground surface, and (c) a signal processor for determining said ground speed of the vehicle, according to a Doppler effect on the basis of a frequency of said transmitted wave and a frequency of the reflected wave, wherein the improvement comprises:

vehicle speed estimating means for obtaining an estimated vehicle speed on the basis of a rotating speed of a wheel of the vehicle;

said signal processor comprising relationship obtaining means for obtaining a relationship between said estimated vehicle speed and a provisional vehicle speed determined on the basis of said frequencies of said transmitted and reflected waves, when the vehicle is in a steady running state in which said estimated vehicle speed accurately represents said ground speed of the vehicle, said relationship comprising a compensating value; and said signal processor further comprising final-speed determining means for determining a final vehicle speed as said ground speed, in said steady running state and in a transient running state of the vehicle in which said estimated vehicle speed does not accurately represent said ground speed, said final-speed determining means determining, at least when the vehicle is in said transient running state, said final vehicle speed by multiplying said relationship comprising said compensating value by said provisional vehicle speed, said relationship obtained in the steady running state which precedes said transient running state.

7. A Doppler-effect speed detecting apparatus according to claim 6, wherein said signal processor further comprises running-state detecting means for detecting said steady running state of the vehicle, said running-state detecting means including means for detecting the absence of braking of said vehicle as a condition for detecting said steady running state.

8. A Doppler-effect speed detecting apparatus according to claim 7, wherein said running-state detecting means further includes means for determining, as another condition for detecting said steady running state, that an absolute value of acceleration or deceleration of said vehicle is smaller than a predetermined threshold.

9. A Doppler-effect speed detecting apparatus according to claim 6, wherein said relationship obtaining means of said signal processor obtains as said relationship a compensating coefficient when said vehicle is in said steady running state, and said final-speed determining means calculates, when said vehicle is in said transient running state, said final vehicle speed by multiplying said provisional vehicle speed by said compensating coefficient obtained in the steady running state which precedes said transient running state.

10. A Doppler-effect speed detecting apparatus according to claim 9, wherein said relationship obtaining means obtains, in said steady running state of the vehicle, a difference by subtracting a last value of said final vehicle speed from a present value of said estimated vehicle speed, and a quotient by dividing said difference by said present value of said estimated vehicle speed, said relationship obtaining means updating said compensating coefficient by adding said quotient to a present value of said compensating coefficient when said vehicle is in said steady running state, said final-speed determining means calculating, in said transient running state of the vehicle,, said final vehicle speed by multiplying said provisional vehicle speed by a last value of said compensating coefficient updated in the steady running state which precedes said transient running state.

11. A Doppler-effect speed detecting apparatus according to claim 10, wherein when said vehicle is in said steady running state, said final-speed determining means calculates said final vehicle speed by multiplying said provisional vehicle speed by said compensating coefficient which is updated from time to time by said relationship obtaining means.

12. A Doppler-effect speed detecting apparatus according to claim 6, wherein said relationship obtaining means of said signal processor obtains as said relationship a speed difference between said estimated and provisional vehicle speeds when said vehicle is in said steady running state, and said final-speed determining means calculates, when said vehicle is in said transient running state, said final vehicle speed by adding to said provisional vehicle speed said speed difference obtained in said steady running state which precedes said transient running state.

13. A Doppler-effect speed detecting apparatus according to claim 6, wherein said signal processor further comprises preventing means for preventing said final-speed determining means from determining, in said transient running state of the vehicle, said final vehicle speed on the basis of said relationship which was obtained in said steady running state of the vehicle under an influence of said provisional vehicle speed obtained when an output level of said receiver is lower than a predetermined threshold.

14. A Doppler-effect speed detecting apparatus according to claim 13, wherein said relationship obtaining means of said signal processor obtains as said relationship a compensating coefficient when said vehicle is in said steady running state, and said final-speed determining means calculates, when the vehicle is in said transient running state, said final vehicle speed by multiplying said provisional vehicle speed by a last value of said compensating coefficient obtained in the steady running state which precedes said transient running state, and wherein said preventing means permits, if said output level is not lower than said predetermined threshold, said relationship obtaining means to obtain, in said steady running state of the vehicle, a difference by subtracting a last value of said final vehicle speed from a present value of said estimated vehicle speed, and a quotient by dividing said difference by said present value of said estimated vehicle speed, so that said relationship obtaining means updates said compensating coefficient by adding said quotient to a present value of said compensating coefficient when said vehicle is in said steady running state and when said output level is not lower than said predetermined threshold, said preventing means requiring, if said output level is lower than said predetermined threshold, said relationship obtaining means to maintain a last value of said compensating coefficient updated when said output level is not lower than said predetermined threshold.

15. A Doppler-effect speed detecting apparatus according to claim 6, further comprising means for generating a Doppler-frequency signal indicative of a Doppler frequency determined by said frequencies of said transmitted and reflected waves, and wherein said signal processor further comprises period determining means for detecting a period of said Doppler-frequency signal and determining a final value of said period, and provisional-speed determining means for determining said provisional vehicle speed on the basis of said final value of said period of said Doppler-frequency signal determined by said period determining means, and wherein said period determining means defines a variable reference range of said period of said Doppler-frequency signal such that said variable reference range is wider when said final vehicle speed previously determined by said final-speed determining means is relatively low than when the previously determined final vehicle speed is relatively high, said period determining means determining the detected value of said period as said final value thereof if said detected value is held within said variable reference range, and adjusting said detected value to obtain said final value if said detected value is outside said variable reference range.

16. A Doppler-effect speed detecting apparatus for detecting a ground speed of a motor vehicle, having (a) a transmitter for transmitting a wave toward a ground surface, (b) a receiver for receiving a portion of the transmitted wave which is reflected by the ground surface, and (c) signal generating means for generating a Doppler-frequency signal indicative of a Doppler frequency determined by said frequencies of the transmitted and reflected waves, and (d) a signal processor for detecting a present value of a period of said Doppler frequency signal as a provisional value of said period, determining said provisional value of said period as a final value thereof if said provisional value is held within a reference range determined by at least one previously obtained value of said period, adjusting said provisional value to obtain said final value if said provisional value is outside said reference range, and determining said ground speed of the vehicle on the basis of said final value of said period, wherein the improvement comprises:

said signal processor comprising range determining means for defining as said reference range a variable reference range such that said reference range is wider when said ground speed of the vehicle previously determined by said signal processor is relatively low than when the previously determined ground speed is relatively high.

17. A Doppler-effect speed detecting apparatus according to claim 16, wherein said at least one previously obtained value of said period of said Doppler-frequency signal consists of an average of a plurality of said provisional values of said period previously obtained by said signal processor, said upper and lower limits of said range varying with a change in said average.

18. A Doppler-effect speed detecting apparatus according to claim 16, wherein said range determining means determines an upper limit and a lower limit which define a first range used when said previously determined ground speed of the vehicle is higher than a predetermined lower limit, said upper and lower limits having a constant difference to define a constant width of said first range and varying with a change in said at least one previously obtained value of the period of said Doppler-frequency signal, said range determining means defining a second range which is used when said previously determined ground speed of the vehicle is not higher than said predetermined lower limit, said second range having an infinitely large width so that said provisional value of said period is determined as said final value thereof when said previously determined ground speed of the vehicle is not higher than said predetermined lower limit.

19. A Doppler-effect speed detecting apparatus according to claim 16, wherein said range determining means determines a first upper limit and a first lower limit which define a first range used when said previously determined ground speed of the vehicle is higher than a predetermined lower limit, said first upper and lower limits having a constant difference to define a first constant width of said first range, said range determining means determining a second upper limit and a second lower limit which define a second range used when said previously determined ground speed is not higher than said predetermined lower limit, said second upper and lower limits having a constant difference to define a second constant width of said second range smaller than said first constant width, said first and second upper and lower limits varying with a change in said at least one previously obtained value of said period of said Doppler-frequency signal.

20. A Doppler-effect speed detecting apparatus according to claim 16, wherein said signal processor adjusts said provisional value of said period of said Doppler-frequency signal to a predetermined value within said first range to determine said predetermined value as said final value of said period if said provisional value of said period is outside said first range.

* * * * *